(12) United States Patent
Lee et al.

(10) Patent No.: US 10,978,048 B2
(45) Date of Patent: Apr. 13, 2021

(54) ELECTRONIC APPARATUS FOR RECOGNIZING KEYWORD INCLUDED IN YOUR UTTERANCE TO CHANGE TO OPERATING STATE AND CONTROLLING METHOD THEREOF

(71) Applicant: Samsung Electronics Co., Ltd., Gyeonggi-do (KR)

(72) Inventors: Tae Jin Lee, Gyeonggi-do (KR); Young Woo Lee, Seoul (KR); Seok Yeong Jung, Gyeonggi-do (KR); Chakladar Subhojit, Gyeonggi-do (KR); Jae Hoon Jeong, Gyeonggi-do (KR); Jun Hui Kim, Seoul (KR); Jae Geun Lee, Seoul (KR); Hyun Woong Lim, Gyeonggi-do (KR); Soo Min Kang, Seoul (KR); Eun Hye Shin, Gyeonggi-do (KR); Seong Min Je, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 15/987,115

(22) Filed: May 23, 2018

(65) Prior Publication Data
US 2018/0342237 A1 Nov. 29, 2018

(30) Foreign Application Priority Data
May 29, 2017 (KR) ......... 10-2017-0066462

(51) Int. Cl.
*G10L 17/00* (2013.01)
*G10L 15/08* (2006.01)
(Continued)

(52) U.S. Cl.
CPC ........... *G10L 15/08* (2013.01); *G10L 15/22* (2013.01); *G10L 15/26* (2013.01); *G10L 15/28* (2013.01);
(Continued)

(58) Field of Classification Search
None
See application file for complete search history.

(56) References Cited

U.S. PATENT DOCUMENTS 6,804,642 B1 * 10/2004 Naylor ............... G10L 15/285
704/231
6,937,977 B2 * 8/2005 Gerson ............... G10L 25/78
370/522
(Continued)

FOREIGN PATENT DOCUMENTS

EP 2 728 890 A2 5/2014
KR 10-2010-0032140 A 3/2010
(Continued)

OTHER PUBLICATIONS

European Search Report dated Sep. 3, 2018.

*Primary Examiner* — Richard Z Zhu
(74) *Attorney, Agent, or Firm* — Cha & Reiter, LLC.

(57) ABSTRACT

An apparatus comprising one or more processors, a communication circuit, and a memory for storing instructions, which when executed, performs a method of recognizing a user utterance. The method comprises: receiving first data associated with a user utterance, performing, a first determination to determine whether the user utterance includes the first data and a specified word, performing a second determination to determine whether the first data includes the specified word, transmitting the first data to an external server, receiving a text generated from the first data by the external server, performing a third determination to determine whether the received text matches the specified word,
(Continued)

and determining whether to activate the voice-based input system based on the third determination.

19 Claims, 10 Drawing Sheets

(51) Int. Cl.
*G10L 15/22* (2006.01)
*G10L 15/28* (2013.01)
*G10L 15/26* (2006.01)
*G10L 15/30* (2013.01)
*G10L 25/78* (2013.01)
*G10L 15/34* (2013.01)

(52) U.S. Cl.
CPC .............. *G10L 15/30* (2013.01); *G10L 15/34* (2013.01); *G10L 17/00* (2013.01); *G10L 25/78* (2013.01); *G10L 2015/088* (2013.01); *G10L 2015/223* (2013.01); *H04M 2201/405* (2013.01)

(56) References Cited

U.S. PATENT DOCUMENTS

| | | | |
|---|---|---|---|
| 7,502,737 | B2 | 3/2009 | Sharma |
| 9,430,629 | B1* | 8/2016 | Ziraknejad ............ G06F 16/583 |
| 9,502,039 | B2* | 11/2016 | Foerster ................. G06F 3/167 |
| 9,704,486 | B2* | 7/2017 | Basye ..................... G10L 15/28 |
| 9,775,113 | B2 | 9/2017 | Sun et al. |
| 9,818,407 | B1* | 11/2017 | Secker-Walker ....... G10L 15/32 |
| 9,881,615 | B2 | 1/2018 | Choi et al. |
| 9,972,343 | B1* | 5/2018 | Thorson .................. G10L 25/84 |
| 10,079,015 | B1* | 9/2018 | Lockhart ................ G10L 15/22 |
| 2003/0236664 | A1 | 12/2003 | Sharma |
| 2007/0005206 | A1* | 1/2007 | Zhang ........................ G06F 3/16 701/36 |
| 2007/0201639 | A1* | 8/2007 | Park ........................ G10L 15/30 379/90.01 |
| 2009/0119103 | A1* | 5/2009 | Gerl ........................ G10L 17/04 704/243 |
| 2012/0290303 | A1* | 11/2012 | Lee ......................... G10L 15/22 704/251 |
| 2014/0006825 | A1* | 1/2014 | Shenhav ............... G06F 1/3206 713/323 |
| 2014/0123185 | A1 | 5/2014 | Nam et al. |
| 2014/0172953 | A1* | 6/2014 | Blanksteen ............ H04L 67/22 709/203 |
| 2015/0120299 | A1* | 4/2015 | Thomsen ................ G10L 15/22 704/246 |
| 2016/0027439 | A1* | 1/2016 | Sharifi .................... G10L 15/08 704/235 |
| 2016/0125883 | A1* | 5/2016 | Koya ..................... G10L 15/30 704/232 |
| 2016/0171976 | A1 | 6/2016 | Sun et al. |
| 2016/0240194 | A1 | 8/2016 | Lee et al. |
| 2017/0053652 | A1 | 2/2017 | Choi et al. |
| 2017/0110117 | A1 | 4/2017 | Chakladar et al. |
| 2019/0139545 | A1* | 5/2019 | Yuan ....................... G10L 15/22 |

FOREIGN PATENT DOCUMENTS

| | | |
|---|---|---|
| KR | 10-2016-0100765 A | 8/2016 |
| KR | 10-2017-0022445 A | 3/2017 |

* cited by examiner

ELECTRONIC APPARATUS FOR RECOGNIZING KEYWORD INCLUDED IN YOUR UTTERANCE TO CHANGE TO OPERATING STATE AND CONTROLLING METHOD THEREOF

CROSS-REFERENCE TO RELATED APPLICATION(S)

This application is based on and claims priority under 35 U.S.C. § 119 to Korean Patent Application No. 10-2017-0066462, filed on May 29, 2017, in the Korean Intellectual Property Office, the disclosure of which is incorporated herein by reference in its entirety.

TECHNICAL FIELD

The present disclosure relates to a technology for processing a user utterance.

BACKGROUND

In addition to a conventional input scheme using a keyboard or a mouse, electronic apparatuses have recently supported various input schemes, such as a voice input and the like. For example, electronic apparatuses such as smartphones or tablet PCs may recognize the voice of a user input in a state where a speech recognition service is being executed and may execute an action in response to the voice input or may provide a result that is found based on the voice input.

Recent speech recognition services are being developed based on a technology that processes natural language. The technology for processing the natural language refers to a technology that is capable of grasping the intent of the user's utterance and generates a result that matches the user's intent to provide the user with the result.

The above information is presented as background information only to assist with an understanding of the present disclosure. No determination has been made, and no assertion is made, as to whether any of the above might be applicable as prior art with regard to the present disclosure.

SUMMARY

In the case where an electronic apparatus recognizes a user utterance, including a keyword for operating a configuration that performs a task, the electronic apparatus may fail to process the user utterance for operating the electronic apparatus. This may occur because the electronic apparatus does not recognize the keyword or may unnecessarily operate an element for processing the user utterance as a result of the electronic apparatus incorrectly recognizing that the user utterance as not including a keyword.

Aspects of the present disclosure are to address at least the above-mentioned problems and/or disadvantages and to provide at least the advantages described below. Accordingly, an aspect of the present disclosure is to provide a method of processing a user utterance.

In accordance with an aspect of the present disclosure, an electronic apparatus includes a housing, a speaker that is disposed at a first portion of the housing, a microphone that is disposed at a second portion of the housing, a communication circuit that is disposed in or attached to the housing, a digital signal processing (DSP) circuit that is disposed in the housing and electrically connected to the microphone, a processor that is disposed in the housing and operatively connected to the speaker, the DSP circuit, and the communication circuit, and a memory that is disposed in the housing and operatively connected to the processor. While a voice-based input system is in a standby state, the DSP circuit is configured to receive first data associated with a user utterance that is received via the microphone. The DSP circuit is configured to receive the first data that is associated with the user utterance to make a first determination on whether the first data includes a specified word and to provide the first data to the processor. The memory stores one or more instructions which, when executed, cause the processor to receive the first data from the DSP circuit, to make a second determination on whether the first data includes the specified word, to transmit the first data to an external server via the communication circuit, to receive text generated from the first data by the external server via the communication circuit, to make a third determination on whether the received text matches the specified word, and to determine whether to activate the voice-based input system based on the third determination.

In accordance with another aspect of the present disclosure, an electronic apparatus includes a housing, a speaker that is disposed at a first portion of the housing, a microphone that is disposed at a second portion of the housing, a communication circuit that is disposed in or attached to the housing, a DSP circuit that is disposed in the housing and electrically connected to the microphone, a processor that is disposed in the housing and operatively connected to the speaker, the DSP circuit, and the communication circuit, and a memory that is disposed in the housing and operatively connected to the processor. While a voice-based input system is in a standby state, the DSP circuit is configured to receive first data associated with a user utterance that is received via the microphone The DSP circuit is configured to receive the first data associated with the user utterance to make a first determination on whether the first data includes a specified word and to provide the first data to the processor. The memory stores one or more instructions which, when executed, cause the processor to receive the first data from the DSP circuit, to make a second determination on whether the first data includes the specified word, to transmit the first data to an external server via the communication circuit, to receive a text generated from the first data by the external server via the communication circuit within a specified period of time, to make a third determination on whether the received text matches the specified word, and to determine whether to activate the voice-based input system, based on the third determination.

In accordance with another aspect of the present disclosure, a method of recognizing a user utterance includes receiving first data associated with a user utterance that is received via a microphone, performing a first determination on whether the user utterance includes the first data and a specified word via a DSP circuit, performing a second determination on whether the first data includes the specified word via a processor, transmitting the first data to an external server via a communication circuit, receiving text generated from the first data by the external server via the communication circuit, performing a third determination on whether the received text matches the specified word via the processor, and determining whether to activate the voice-based input system based on the third determination.

According to various embodiments of the present disclosure, it is possible to determine whether a user utterance includes the user intent for changing the state of a user terminal from a standby state to an operating state, and thus the state of a user terminal may be changed to the operating state so as to correspond to the user intent.

Besides, a variety of effects directly or indirectly understood through this disclosure may be provided.

Other aspects, advantages, and salient features of the disclosure will become apparent to those skilled in the art from the following detailed description which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure will be described with reference to accompanying drawings. However, those of ordinary skill in the art will recognize that modifications, equivalents, and/or alternative embodiments described herein can be variously made without departing from the scope and spirit of the present disclosure.

Prior to describing an embodiment of the present disclosure, an integrated intelligent system to which an embodiment of the present disclosure is capable of being applied will be described.

Figure 1:
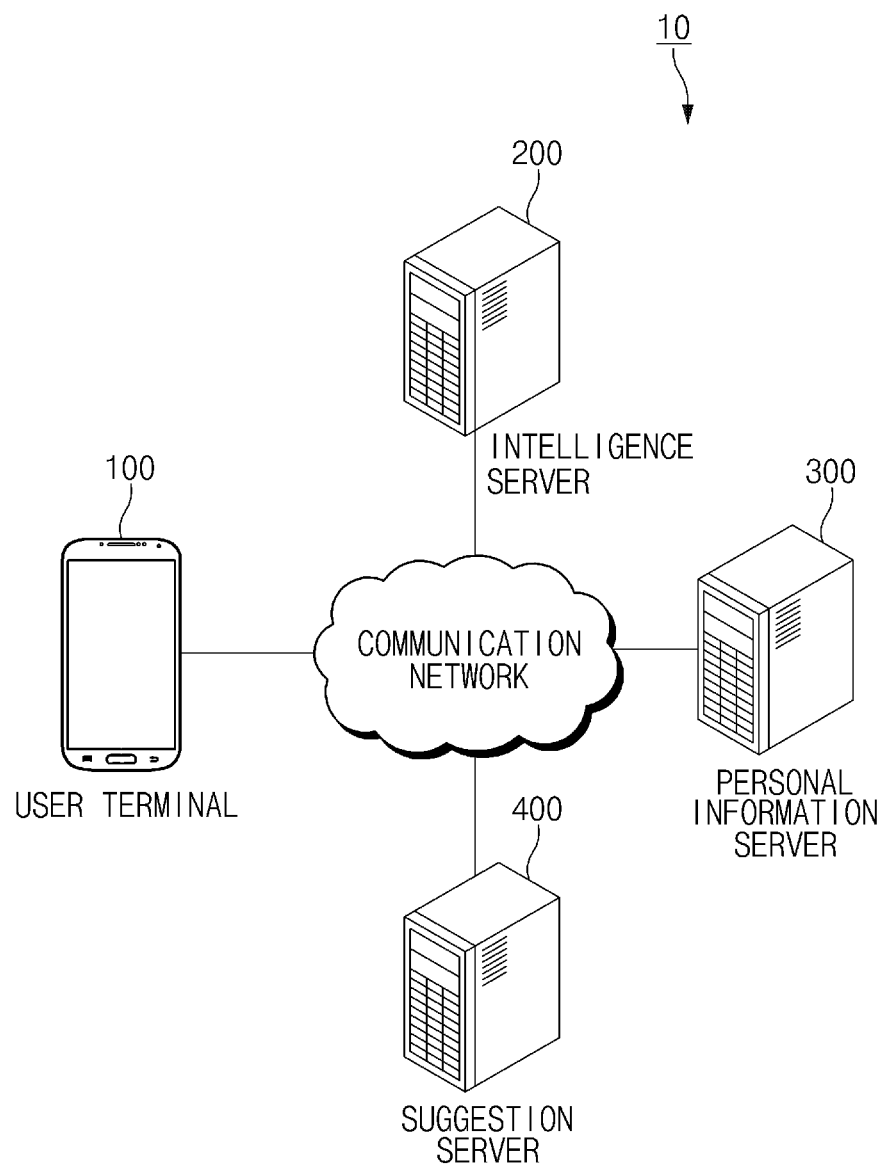
FIG. 1 is a view illustrating an integrated intelligent system, according to various embodiments.

FIG. 1 is a view illustrating an integrated intelligent system, according to various embodiments.

Referring to FIG. 1, an integrated intelligent system 10 may include a user terminal 100, an intelligence server 200, a personal information server 300, or a suggestion server 400.

According to an embodiment, the user terminal 100 may receive user input. For example, the user terminal 100 may receive a user utterance through a microphone. According to an embodiment, the user terminal 100 may receive a user input by using an app (or application program) stored therein. For example, the user terminal 100 may receive a user utterance by using an intelligence app (e.g., speech recognition app). According to an embodiment, the user terminal 100 may execute the operation of an app stored therein based on the user input.

According to an embodiment, the user terminal 100 may receive user utterance as a user input. The user terminal 100 may receive the user utterance and may generate one or more instructions for operating an app based on the user utterance. As such, the user terminal 100 may operate the app by using the generated one or more instructions.

According to an embodiment, various types of terminal devices (or an electronic apparatus) may be connected to the Internet. The user terminal 100 may correspond to, for example, a mobile phone, a smartphone, a personal digital assistant (PDA), a notebook computer, and the like.

According to an embodiment, the intelligence server 200 may receive a user input over a communication network to generate (or select) a path rule. For example, the path rule may include information about an action (or operation) for performing the function of at least one of the user terminal 100 and the external suggestion server 400. The path rule, for example, may include a sequence of states of the user terminal 100. The user terminal 100 may sequentially execute actions corresponding to the states included in the path rule. In addition, the path rule may further include information (or data) about one or more parameters necessary to execute the action. According to an embodiment, for the purpose of performing a task corresponding to a user input, the intelligence server 200 may sequentially arrange a plurality of actions to generate a path rule. The user terminal 100 may receive the path rule, may select an app depending on the path rule, and may execute the action included in the path rule in the selected app.

According to an embodiment, the personal information server 300 may include a database in which user information is stored. For example, the personal information server 300 may receive the user information (e.g., context information, information about execution of an app, and the like) from the user terminal 100 and may store the user information in the database. In the case where the intelligence server 200 generates a path rule associated with the user input, the intelligence server 200 may use the user information that is received from the personal information server 300 over a communication network. According to an embodiment, the user terminal 100 may receive the user information from the personal information server 300 over the communication network, and may use the user information as information for managing the database.

According to an embodiment, the suggestion server 400 may include a database that stores information about a function in a terminal, introduction of an application, or a function to be provided. The suggestion server 400 may generate a database that is associated with a function that a user is capable of utilizing by using the user information of the user terminal 100 received from the personal information server 300. According to an embodiment, the user terminal 100 may receive information about the function that the user is capable of utilizing from the suggestion server 400 over the communication network and may provide the user with the received information.

Figure 2:
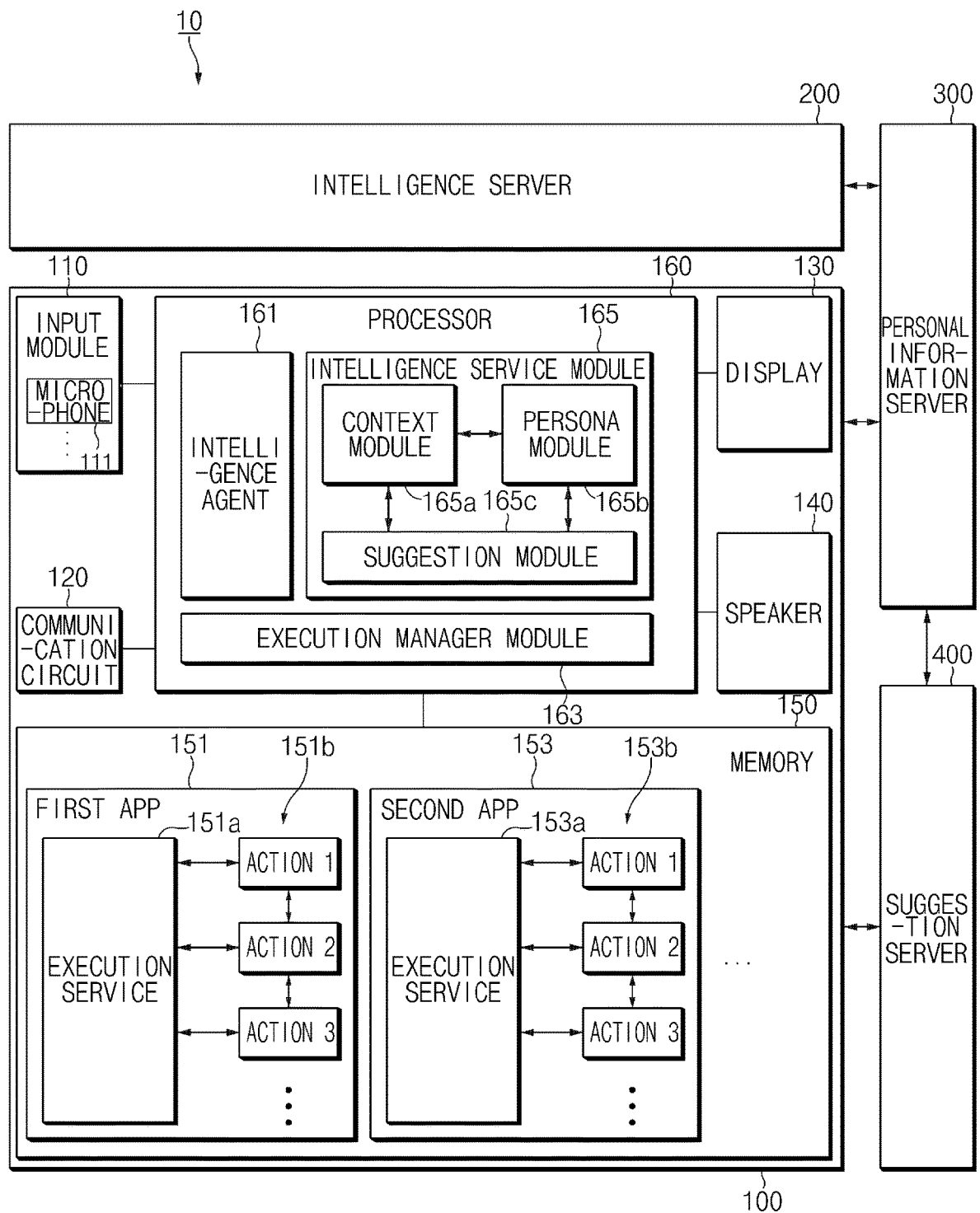
FIG. 2 is a block diagram illustrating a user terminal of an integrated intelligent system, according to an embodiment.

FIG. 2 is a block diagram illustrating a user terminal of an integrated intelligent system, according to an embodiment.

Referring to FIG. 2, the user terminal 100 may include, among other elements, an input module 110, a communication module 120, a display 130, a speaker 140, a non-transitory memory 150, and a processor 160. The user terminal 100 may further include a housing (not illustrated) and the elements of the user terminal 100 may be disposed inside the housing.

According to an embodiment, the input module 110 may receive a user input from a user. For example, the input module 110 may receive the user input from a connected external device (e.g., a keyboard or a headset). As another example, the input module 110 may include a touch screen (e.g., a touch screen display) coupled to the display 130. As a further example, the input module 110 may include a hardware key (or a physical key) disposed in the user terminal 100 (or the housing of the user terminal 100).

According to an embodiment, the input module 110 may include a microphone that is capable of receiving the utterance of the user as a voice signal. The input module 110 may receive the user utterance as a voice signal through a voice-based input system.

According to an embodiment, a communication module (or communication circuit) 120 may be connected to an external electronic apparatus so as to transmit and/or receive a signal. For example, the communication module 120 may include a wireless communication module (e.g., Bluetooth, wireless-fidelity (Wi-Fi), and the like). For example, the wireless communication module may be connected to the intelligence server 200 to transmit and/or receive a signal (e.g., a user input and a path rule corresponding to the user input).

According to an embodiment, the display 130 may display an image, a video, and/or an execution screen of an application. For example, the display 130 may display a graphic user interface (GUI) of an app.

According to an embodiment, the speaker 140 may output a voice signal. For example, the speaker 140 may output a voice signal generated by the user terminal 100 to the outside (e.g., the environment, surroundings, etc., of the user terminal 100). The speaker 140 may be disposed at a first portion of the housing.

According to an embodiment, the memory 150 may include a database that stores information for recognizing the user's utterance. For example, the memory 150 may store information for recognizing a specified word (or keyword). For example, the information for recognizing a specified word may include feature information of the specified word. The feature information, for example, may be feature vector of user utterance of the specified word for recognizing the specified word. As another example, the memory 150 may store information for recognizing a speaker. For example, the information for recognizing a speaker may include feature information of the speaker.

According to an embodiment, the memory 150 may store a plurality of apps 151 and 153. For example, the plurality of apps 151 and 153 stored in the memory 150 may include execution services 151*a* and 153*a* or a plurality of actions (or unit actions) 151*b* and 153*b*. After the plurality of apps 151 and 153 are loaded by the processor 160, the execution services 151*a* and 153*a* may be generated, and then the plurality of actions 151*b* and 153*b* may be executed by the execution services 151*a* and 153*a*.

According to an embodiment, the execution services 151*a* and 153*a* may execute the actions 151*b* and 153*b* based on a path rule. For example, the execution services 151*a* and 153*a* may be generated by an execution manager module 163, may receive an execution request according to the path rule from the execution manager module 163, and may execute the actions 151*b* and 153*b* of the apps 151 and 153 based on the execution request. When the execution of the actions 151*b* and 153*b* is completed, the execution services 151*a* and 153*a* may transmit completion information to the execution manager module 163.

According to an embodiment, in the case where the plurality of the actions 151*b* and 153*b* are respectively executed in the apps 151 and 153, the plurality of the actions 151*b* and 153*b* may be sequentially executed. When the execution of one action (action 1) is completed, the execution services 151*a* and 153*a* may open the next action (action 2) and may transmit completion information to the execution manager module 163. Here, it is understood that opening an arbitrary action is to change a state of the arbitrary action to an executable state or to prepare the execution of the action. In other words, when the arbitrary action is not opened, the corresponding action may not be executed. When the completion information is received, the execution manager module 163 may transmit an execution request to each of the execution services 151*a* and 151*b* for the next actions 151*b* and 153*b* (e.g., action 2). According to an embodiment, in the case where the plurality of apps 151 and 153 are executed, the plurality of apps 151 and 153 may be sequentially executed. For example, when receiving the completion information after the execution of the last action of the first app 151 is completed, the execution manager module 163 may transmit the execution request of the first action of the second app 153 to the execution service 153*a*.

According to an embodiment, in the case where the plurality of the actions 151*b* and 153*b* are executed in the apps 151 and 153, a result screen according to the execution of each of the executed plurality of the actions 151*b* and 153*b* may be displayed on the display 130. According to an embodiment, only a part of a plurality of the result screens according to the executed plurality of the actions 151*b* and 153*b* may be displayed on the display 130.

According to an embodiment, the memory 150 may store an intelligence app (e.g., a speech recognition app) that operates in conjunction with an intelligence agent 161. The app operating in conjunction with the intelligence agent 161 may receive and process the utterance of the user as a voice signal. According to an embodiment, the app operating in conjunction with the intelligence agent 161 may be operated by a specific input (e.g., an input through a hardware key, an input through a touch screen, a specific voice input, and the like) that is input through the input module 110.

According to an embodiment, the processor 160 may control overall actions of the user terminal 100. The processor 160 may be operatively connected to the input module 110, the communication module 120, the display 130, the speaker 140, and the memory 150. For example, the processor 160 may control the input module 110 to receive the user input. The processor 160 may control the display 130 to display an image. The processor 160 may control the speaker 140 to output the voice signal. The processor 160 may control the memory 150 to read and/or store information.

According to an embodiment, the processor 160 may include the intelligence agent 161, the execution manager module 163, an intelligence service module 165, or any combination thereof. When an instruction stored in the memory 150 has been executed, the processor 160 may perform an operation of processing a user input. In an embodiment, the processor 160 may drive the intelligence agent 161, the execution manager module 163, and/or the intelligence service module 165 by executing instructions stored in the memory 150. Modules described in various embodiments of the present disclosure may be implemented by hardware or by software. In various embodiments of the present disclosure, it is understood that the action executed by the intelligence agent 161, the execution manager module 163, and/or the intelligence service module 165 is an action executed by the processor 160.

According to an embodiment, the intelligence agent 161 may receive a user input through the input module 110. For example, the intelligence agent 161 may receive a user utterance as a user input through a microphone that is included in the input module 110. According to an embodiment, the intelligence agent 161 may include a speech recognition module for recognizing the user utterance. The speech recognition module, for example, the intelligence agent 161 may include a keyword recognition module for recognizing a specified word, and a speaker recognition module for recognizing a speaker.

According to an embodiment, the intelligence agent 161 may generate an instruction for operating an app based on the voice signal received as the user input. According to an embodiment, the execution manager module 163 may receive the generated instruction from the intelligence agent 161, and may select, launch, and operate the apps 151 and 153 stored in the memory 150. According to an embodiment, the intelligence service module 165 may manage information of the user and may use the information of the user to process the user input.

The intelligence agent 161 may transmit and process the user input received through the input module 110 to the intelligence server 200.

According to an embodiment, before transmitting the user input to the intelligence server 200, the intelligence agent 161 may pre-process the user input. According to an embodiment, to pre-process the user input, the intelligence agent 161 may include an adaptive echo canceller (AEC) module, a noise suppression (NS) module, an end-point detection (EPD) module, an automatic gain control (AGC) module, or any combination thereof. The AEC may remove an echo included in the user input. The NS module may suppress a background noise included in the user input. The EPD module may detect an end-point of a user voice included in the user input to search for a part in which the user voice is present. The AGC module may recognize the user input and may adjust the volume of the user input so as to be suitable to process the recognized user input. According to an embodiment, the intelligence agent 161 may include all the pre-processing elements for performance. However, in another embodiment, the intelligence agent 161 may include a part of the pre-processing elements to operate at low power.

According to an embodiment, the intelligence agent 161 may include a wakeup recognition module that recognizes a call of a user. The wakeup recognition module may recognize the wakeup instruction of a user through a speech recognition module. The wakeup instruction may be an instruction for changing the state of the intelligence agent 161 of the user terminal 100 to a wakeup state. In other words, the wakeup instruction may be an instruction for activating the intelligence agent 161 of the user terminal 100. In the case where the user terminal 100 receives the wakeup instruction, the user terminal 100 may recognize a user utterance and may activate the intelligence agent 161 for the purpose of processing a user input to generate a path rule. For example, the wakeup instruction may be a user utterance including a specified word. According to an embodiment, the wakeup recognition module of the intelligence agent 161 may be implemented with a digital signal processor (DSP). For example, the DSP may be implemented with a low-power processor and may recognize a user utterance including a specified word. According to an embodiment, the user terminal 100 may activate the intelligence agent 161 through a hardware key for the purpose of processing a user input to generate a path rule. In the case where the intelligence agent 161 is activated, an intelligence app (e.g., a speech recognition app) operating in conjunction with the intelligence agent 161 may be executed.

According to an embodiment, the speech recognition module of the intelligence agent 161 may recognize a user input (e.g., user utterance) by using an algorithm for recognizing a voice. For example, the algorithm for recognizing the voice may be at least one (e.g., HMM-DNN algorithm) of Gaussian mixture model (GMM) algorithm, a hidden Markov model (HMM) algorithm, an artificial neural network (ANN) algorithm, and a dynamic time warping (DTW) algorithm.

According to an embodiment, the intelligence agent 161 may change the voice input of the user to text data. According to an embodiment, the intelligence agent 161 may transmit the voice of the user to the intelligence server 200 to receive the changed text data. As such, the intelligence agent 161 may display the text data on the display 130. According to an embodiment, the intelligence agent 161 may receive a path rule from the intelligence server 200.

According to an embodiment, the intelligence agent 161 may select the apps 151 and 153 stored in the memory 150 based on the received path rule and may generate an instruction for executing the actions 151b and 153b included in the selected app. The execution manager module 163 may execute and bind the selected apps 151 and 153 and may receive the generated instruction from the intelligence agent 161 to execute the operations of the selected apps 151 and 153. The execution manager module 163 may sequentially transmit the actions 151b and 153b included in the path rule to the apps 151 and 153. Furthermore, the execution manager module 163 may receive completion information of the actions 151b and 153b from the apps 151 and 153.

According to an embodiment, the intelligence agent 161 may receive information about an execution state of the operations of the apps 151 and 153. For example, the intelligence agent 161 may receive information about an execution state of the operations of the apps 151 and 153 through the execution manager module 163. For example, in the case where the execution states of the actions 151b and 153b are in partial landing, the execution manager module 163 may transmit information about the partial landing to the intelligence agent 161. In the partial landing, the execution manager module 163 may stop performing the actions 151b and 153b in the case where a parameter (e.g., text) necessary for the actions 151b and 153b. The intelligence agent 161 may make a request for an input of necessary information (e.g., parameter information) to the user by using the received information. As another example, in the case where the execution state of the actions 151b and 153b are in a progress state, the user's utterance may be received from the user, and the execution manager module 163 may transmit information about the apps 151 and 153 that are being executed and the execution states of the apps 151 and 153, along with the user's utterance to the intelligence agent 161. The intelligence agent 161 may transmit the received user utterance to the intelligence server 200. The intelligence agent 161 may receive parameter information of the user's utterance through the intelligence server 200 and may transmit the received parameter information to the execution manager module 163. The execution manager module 163 may change a parameter of each of the actions 151*b* and 153*b* to a new parameter by using the received parameter information.

According to an embodiment, the execution manager module 163 may transmit the parameter information included in the path rule to the apps 151 and 153. In the case where the plurality of apps 151 and 153 are sequentially executed based on the path rule, the execution manager module 163 may transmit the parameter information included in the path rule from one app to another app.

According to an embodiment, the execution manager module 163 may receive a plurality of path rules. The plurality of path rules may be provided by the intelligence server 200. The execution manager module 163 may select a plurality of path rules based on the utterance of the user. For example, in the case where the user utterance specifies one app 151 for executing one action 151*b*, but does not specify the other app 153 for executing the other action 153*b*, the execution manager module 163 may receive a plurality of different path rules, in which the same app 151 (e.g., gallery app) executing the one action 151*b* is executed and in which a different app 153 (e.g., message app or Telegram app) executing the other action 153*b* is executed. For example, the execution manager module 163 may execute the same actions 151*b* and 153*b* (e.g., the same successive actions 151*b* and 153*b*) of the plurality of path rules. In the case where the execution manager module 163 executes the same action, the execution manager module 163 may display a state screen for selecting the different apps 151 and 153 included in the plurality of path rules on the display 130.

According to an embodiment, the intelligence agent 161 may transmit an execution result log according to the received path rule to the intelligence service module 165, and the transmitted execution result log may be accumulated and managed as preference information of the user in a persona module 165*b*.

According to an embodiment, the intelligence service module 165 may include a context module 165*a*, the persona module 165*b*, a suggestion module 165*c*, or any combination thereof.

The context module 165*a* may collect current states of the apps 151 and 153 from the apps 151 and 153. For example, the context module 165*a* may receive context information indicating the current states of the apps 151 and 153 for collecting the current states of the apps 151 and 153.

The persona module 165*b* may manage personal information of the user utilizing the user terminal 100. For example, the persona module 165*b* may collect the usage information and the execution result of the user terminal 100 to manage personal information of the user.

The suggestion module 165*c* may predict the intent of the user to recommend an instruction to the user. For example, the suggestion module 165*c* may recommend an instruction to the user in consideration of the current state (e.g., a time, a place, a situation, or an app) of the user.

Figure 3:
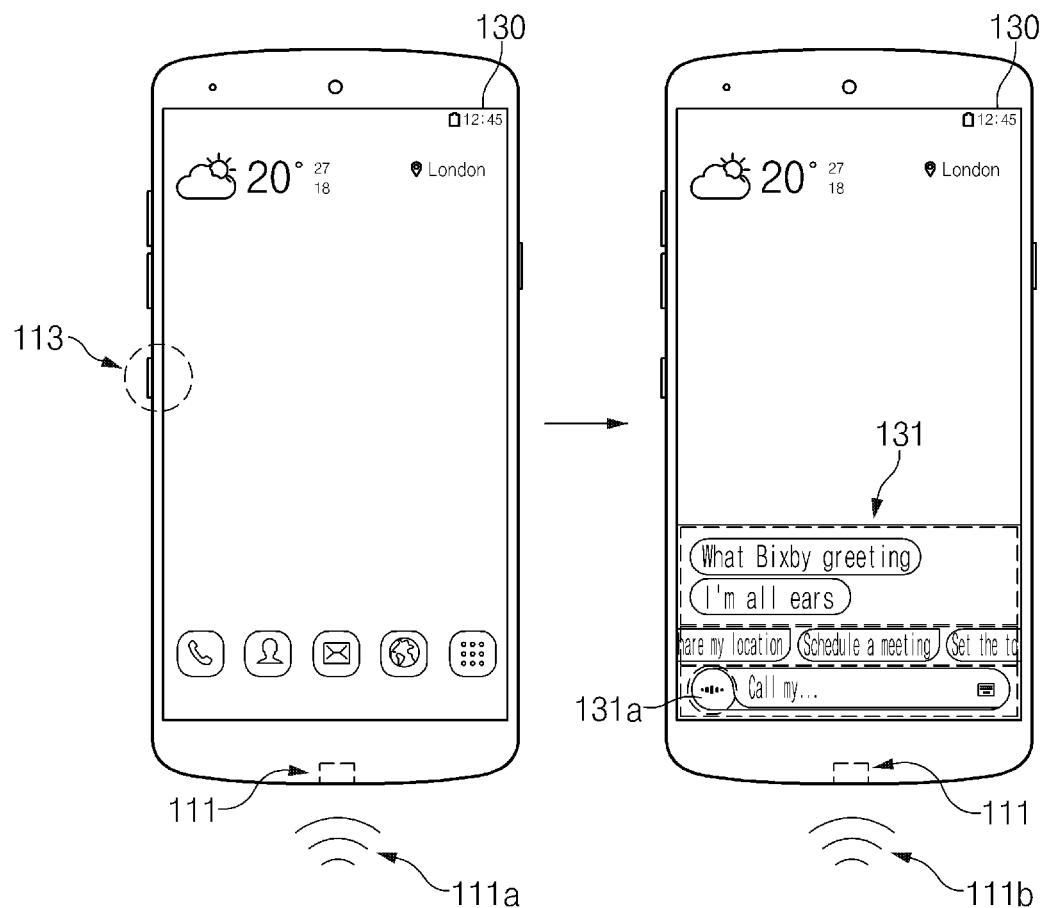
FIG. 3 is a view illustrating that an intelligence app of a user terminal is executed, according to an embodiment.

FIG. 3 is a view illustrating that an intelligence app of a user terminal is executed, according to an embodiment.

FIG. 3 illustrates that the user terminal 100 receives a user input to execute an intelligence app (e.g., a speech recognition app) that is operating in conjunction with the intelligence agent 161.

According to an embodiment, the user terminal 100 may execute the intelligence app for recognizing a voice through a microphone 111. The microphone 111 may be disposed at a second portion of the housing of the terminal 100. For example, in the case where the user terminal 100 receives a user input 111*a* that includes a specified word (e.g., wake up!) through the microphone 111, the user terminal 100 may display a UI 131 of an intelligence app on the display 130. As another example, the user terminal 100 may receive a user input to generate a path rule through the microphone 111 together with the specified word. The user terminal 100 may display the UI 131 of the intelligence app on the display 130 and may transmit an input to the intelligence server 200 to generate the path rule. According to an embodiment, the user terminal 100 may execute the intelligence app for recognizing a voice through a hardware key 113. For example, in the case where the user terminal 100 receives the user input through the hardware key 113, the user terminal 100 may display the UI 131 of the intelligence app on the display 130. For example, a user may touch a speech recognition button 131*a* of the UI 131 of the intelligence app for the purpose of entering a voice 111*b* in a state where the UI 131 of the intelligence app is displayed on the display 130. As another example, while pressing the hardware key 113 to enter the voice 111*b*, the user may enter the voice 111*b*.

According to another embodiment, the user terminal 100 may execute the intelligence app to output a specified sound (e.g., announcement voice or beep sound) through the speaker 140, instead of displaying the UI 131 of the intelligence app on the display 130 by executing the intelligence app for receiving a user input. Moreover, the user terminal 100 may output the specified sound through the speaker 140 together with displaying the UI 131 of the intelligence app on the display 130.

Figure 4:
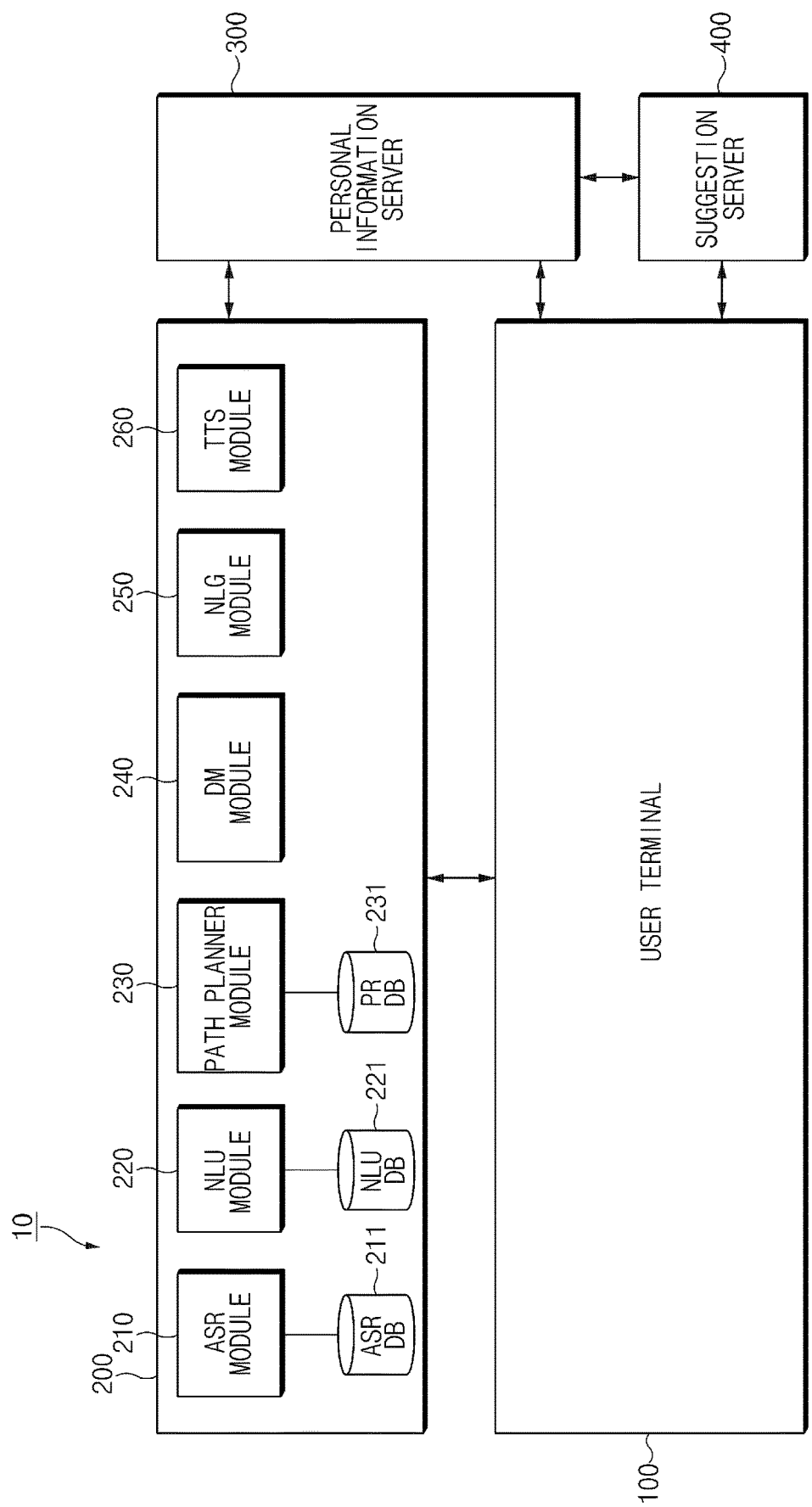
FIG. 4 is a block diagram illustrating an intelligence server of an integrated intelligent system, according to an embodiment.

FIG. 4 is a block diagram illustrating an intelligence server of an integrated intelligent system, according to an embodiment.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, a text to speech (TTS) module 260, or any combination thereof.

The NLU module 220 or the path planner module 230 of the intelligence server 200 may generate a path rule.

According to an embodiment, the ASR module 210 may change the user input received from the user terminal 100 to text data.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may change user speech to text data by using the information associated with phonation and unit phoneme information. Furthermore, the ASR module 210 may perform large vocabulary speech recognition through deep learning based on the converted text data. For example, the information about the acoustic model and the language model may be stored in an automatic speech recognition database (ASR DB) 211. Also, the result of performing the large vocabulary speech recognition may be stored in the ASR DB 211 or a separate database for the large vocabulary speech recognition.

According to an embodiment, the ASR module 210 may transmit the generated text data (or text) to the user terminal 100. For example, the user terminal 100 may display text corresponding to a user input by using the text data in the display 130. As another example, the user terminal 100 may recognize a user utterance (e.g., wakeup instruction) including a specified word by using the text data. In other words, the user terminal 100 may compare a user utterance recognized through speech recognition module with the text data to determine whether the user utterance includes a specified word.

According to an embodiment, the ASR module 210 may transmit the generated text data to the NLU module 220. For example, the ASR module 210 may transmit the remaining text data, other than text data corresponding to the specified word recognized to change the state of the user terminal 100 (i.e., the electronic apparatus), in the generated text data to the NLU module 220. The remaining text data may be text data corresponding to an input for generating a path rule.

According to an embodiment, the NLU module 220 may grasp the user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, and the like. As such, the NLU module 220 may obtain a domain, intent, or a parameter (or a slot) necessary to express the intent from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intents (e.g., alarm settings, alarm cancellation, and the like), and one intent may include a plurality of parameters (e.g., a time, the number of iterations, an alarm sound, and the like). For example, the plurality of rules may include one or more essential parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine the user intent. For example, the NLU module 220 may calculate how many words extracted from the user input is included in each of the domain and the intent for the purpose of determining the user intent. According to an embodiment, the NLU module 220 may determine a parameter of the user input by using the words for grasping the intent. The parameter is, for example, necessary to perform the task corresponding to the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed based on the intent of the user input and may determine an action to be executed in the selected app. The NLU module 220 may determine the parameter corresponding to the determined action to generate the path rule. According to an embodiment, the path rule generated by the NLU module 220 may include information about the app to be executed, the action to be executed by the app, and a parameter necessary to execute the action.

According to an embodiment, the NLU module 220 may generate one path rule or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed by the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 based on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. As another example, in the case where only a part of action is specified based on the user utterance, the NLU module 220 may select a plurality of path rules. The NLU module 220 may determine one path rule of the plurality of path rules based on an additional input of the user.

According to an embodiment, the NLU module 220 may transmit the path rule to the user terminal 100 in response to a request for the user input. For example, the NLU module 220 may transmit one path rule corresponding to the user input to the user terminal 100. As another example, the NLU module 220 may transmit the plurality of path rules corresponding to the user input to the user terminal 100. For example, in the case where only a part of the action is specified based on the user utterance, the plurality of path rules may be generated by the NLU module 220.

According to an embodiment, the path planner module 230 may select at least one path rule of the plurality of path rules. For example, the path planner module 230 may map the user intent and the parameter to the path rule set corresponding to the user terminal 100 to select one path rule or a plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in tabular form. For example, the path planner module 230 may transmit a path rule set corresponding to information (e.g., OS information or app information) of the user terminal 100, which is received from the intelligence agent 161, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. As discussed, for example, the path planner module 230 may map the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, a DM module 240 may determine whether the user intent grasped by the NLU module 220 is clear. For example, the DM module 240 may determine whether the user intent is clear based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed on the display 130 after being transmitted to the user terminal 100 or may be changed to a voice form after being transmitted to the TTS module 260.

According to an embodiment, the TTS module 260 may change information of the text form to information of a voice form. The TTS module 260 may receive the information in text form from the NLG module 250, may change the information in text form to information of a voice form, and may transmit the information of the voice form to the user terminal 100. The user terminal 100 may output the information of the voice form to the speaker 140.

According to an embodiment, the NLU module 220, the path planner module 230, and the DM module 240 may be implemented as one module. For example, the NLU module 220, the path planner module 230 and the DM module 240 may be implemented as one module, may determine the user intent and the parameter, and may generate a response (e.g., a path rule) corresponding to the determined user intent and parameter. As such, the generated response may be transmitted to the user terminal 100.

According to an embodiment, the intelligence server 200 may further include a pre-processing module (not illustrated). The intelligence server 200 may perform pre-processing on a user input received from the user terminal 100. For example, the pre-processing module may include an AEC module, a NS module, an EPD module, or an AGC module. As such, the intelligence server 200 may perform pre-processing on the received user input on behalf of the user terminal 100.

Figure 5:
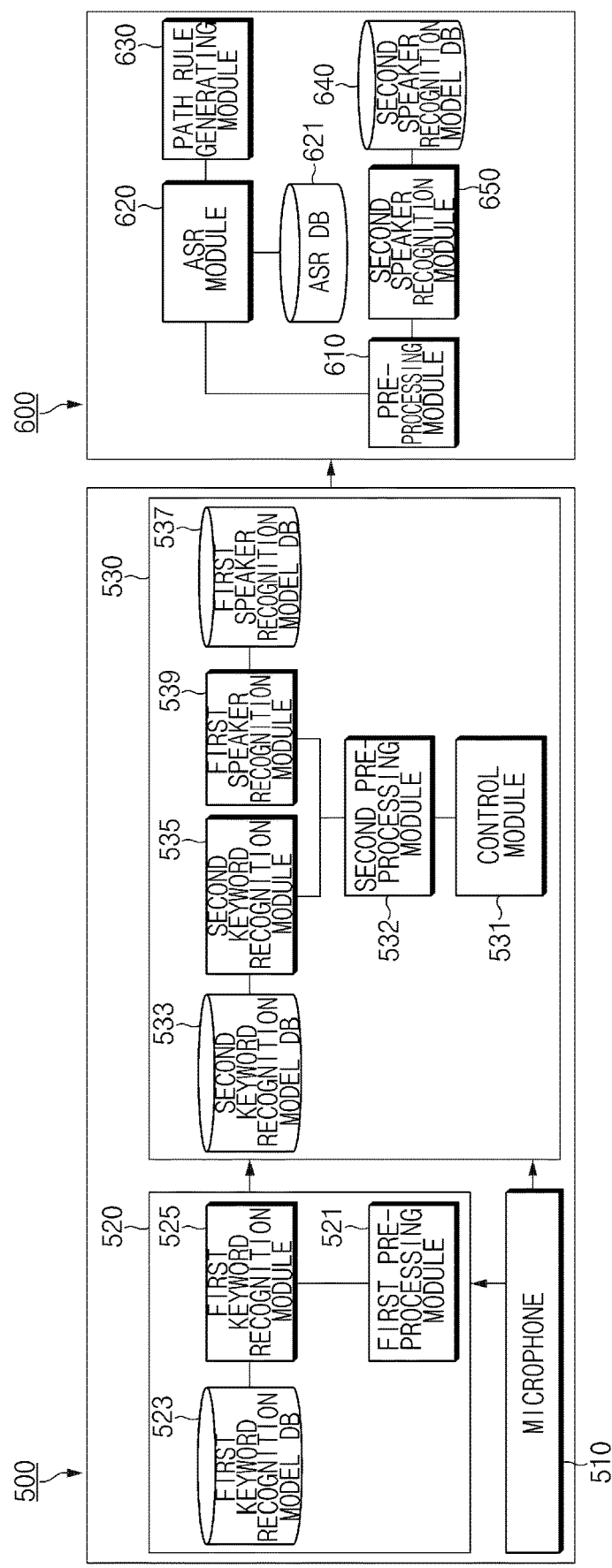
FIG. 5 is a diagram illustrating configurations of a user terminal and an intelligence server for each function, according to an embodiment.

FIG. 5 is a diagram illustrating configurations of a user terminal and an intelligence server for each function, according to an embodiment.

Referring to FIG. 5, a user terminal 500 and an intelligence server (or external server) 600 may be similar to the user terminal 100 and the intelligence server 200 of FIG. 2. In other words, FIG. 5 illustrates that the user terminal 500 and the intelligence server 600 are distinguished from each other depending on functions necessary to change the state of the user terminal 500.

According to an embodiment, the user terminal 500 may include a microphone 510, a DSP (or DSP circuit) 520, and an AP (or processor) 530. The operating states of the DSP 520 and the AP 530 may be changed depending on whether a user utterance for changing the state of the user terminal 500 is recognized. For example, the standby state (or ready state) of the user terminal 500 may be changed to an operating state by the user utterance. The standby state may be a state for receiving a user input for the purpose of changing to a wakeup state and an operating state. The wakeup state may be a state in which the AP 530 is activated and recognize a user utterance. The operating state may be a state for processing a command (e.g., path rule) for a voice command. In other words, the operating state may be a state where a voice-based input system for processing a user input to generate the path rule is activated. According to an embodiment, the DSP 520 and the AP 530 may be implemented with a system on chip (SoC) including a central processing unit (CPU), a non-transitory memory, and the like. Furthermore, the DSP 520 and the AP 530 may be implemented with one processor.

According to an embodiment, the microphone 510 may be similar to the microphone 111 of FIG. 3. The microphone 510 may receive a user utterance. The microphone 510 may change a first user utterance into first data to transmit the first data to the DSP 520. For example, the first user utterance may be a user input for changing (e.g., changing a standby state to an operating state) the state of the user terminal 500.

According to an embodiment, the DSP 520 may include a first pre-processing module 521, a first keyword recognition model database (DB) 523, and a first keyword recognition module 525. According to an embodiment, the DSP 520 may receive the first data corresponding to the first user utterance from the microphone 510.

According to an embodiment, the first pre-processing module 521 may perform pre-processing on the first data (or a user utterance corresponding to the first data) entered through the microphone 510. For example, the first pre-processing module 521 may perform AD/DA converting, gain control, or pre-processing operation (e.g., AEC, NS, or the like) to process the first data.

According to an embodiment, the first keyword recognition model database 523 may store a keyword recognition model (keyword model) for recognizing a user utterance including a specified word. According to an embodiment, the first keyword recognition model database 523 may be implemented with the memory 150 of FIG. 2.

According to an embodiment, the first keyword recognition module 525 may determine whether the specified word is included in the first user utterance (first determination). The first keyword recognition module 525 may be speaker dependent. In other words, the first keyword recognition module 525 may recognize the specified word based on the recognized speaker. Moreover, the first keyword recognition module 525 may be speaker independent. For example, the first keyword recognition module 525 may receive the first data from the first pre-processing module 521 and may calculate a first score $SCORE_{KW1}$ based on the received first data to determine whether the specified word is included in the first user utterance. The first keyword recognition module 525 may calculate the first score $SCORE_{KW1}$ of the first data based on the first keyword recognition model stored in the first keyword recognition model database 523. The first keyword recognition module 525 may calculate the first score $SCORE_{KW1}$ by using at least one of a feature vector and a phoneme model for recognizing the specified word. The first keyword recognition module 525 may compare the first score $SCORE_{KW1}$ with a first reference value $Th_{KW1}$ to determine whether a user input includes the specified word. For example, the first keyword recognition module 525 may determine whether the user input includes the specified word, by following Equation 1. The first reference value $Th_{KW1}$ is determined, for example, by the feature vector of the specified word.

$$SCORE_{KW1}=P(X|\lambda_{KW1})$$

Success if $SCORE_{KW1}>Th_{KW1}$ [Equation 1]

The $\lambda_{KW1}$ may denote the keyword recognition model of the specified word. The keyword recognition model may be generated by using the statistical characteristic of the feature vector extracted from the voice sample corresponding to the specified word. For example, the statistical characteristic may indicate the distribution of the difference value between the feature vector extracted from the voice sample corresponding to the specified word and the feature vector of a plurality of user inputs of the specified word. The keyword recognition model may be a model for recognizing a small number of specified words. According to an embodiment, the first keyword recognition module 525 may substitute the user input into the keyword recognition model to calculate the first score $SCORE_{KW1}$. In other words, the first keyword recognition module 525 may compare the user input with the keyword recognition model to calculate the first score $SCORE_{KW1}$. The first score $SCORE_{KW1}$ may be calculated differently for each used recognition algorithm, and for example, the first score may be a recognition confidence level. According to an embodiment, when the first score $SCORE_{KW1}$ is not less than a first reference value $Th_{KW1}$, the first keyword recognition module 525 may determine that the received first user utterance includes a specified word. As such, in the case where it is recognized that the specified word is included in the first user utterance, the first keyword recognition module 525 may activate the AP 530 to process the user input. According to an embodiment, when the first score $SCORE_{KW1}$ is less than a first reference value $Th_{KW1}$, the first keyword recognition module 525 may determine that the received first user utterance does not include a specified word. As such, in the case where it is recognized that the specified word is not included in the first user utterance, the first keyword recognition module 525 may keep the AP 530 in a standby state.

According to an embodiment, the AP 530 may include a control module 531, a second pre-processing module 532, a second keyword recognition model DB 533, a second keyword recognition module 535, a first speaker recognition model database DB 537, a first speaker recognition module 539, or any combination thereof. According to an embodiment, the AP 530 may receive first data from at least one of the microphone 510 and the DSP 520.

According to an embodiment, the control module 531 may transmit the first data received from one of the microphone 510 and the DSP 520, to the second pre-processing module 532 and the intelligence server 600.

According to an embodiment, the second pre-processing module 532 may perform pre-processing on the first data received from one of the microphone 510 and the DSP 520.

According to an embodiment, the second keyword recognition model database 533 may store a keyword recognition model for recognizing a user input including a specified word. According to an embodiment, the second keyword recognition model database 533 may store a keyword recognition model different from the first keyword recognition model database 523. For example, the keyword recognition model may be changed depending on the used algorithm of a keyword recognition module. According to an embodiment, the second keyword recognition model database 533 may be implemented with the memory 150 of FIG. 2. According to an embodiment, the second keyword recognition module 535 may determine whether a first user input includes a specified word (second determination). The second keyword recognition module 535 may receive the first data received from one of the microphone 510 and the DSP 520. Also, the second keyword recognition module 535 may receive a voice signal corresponding to the first user input from the microphone 510. The second keyword recognition module 535 may calculate a second score $SCORE_{KW2}$ of the first data based on a keyword recognition model stored in second keyword recognition module database 533. The second keyword recognition module 535 may compare the second score $SCORE_{KW2}$ with a second reference value $Th_{KW2}$ to determine whether the user input includes the specified word. For example, the second keyword recognition module 535 may determine whether the user input includes the specified word, by following Equation 2.

$$SCORE_{KW2}=P(X|\lambda_{KW2})$$

Success if $SCORE_{KW2}>Th_{KW2}$ [Equation 2]

The $\lambda_{KW2}$ may denote the keyword recognition model of the specified word. The keyword recognition model may be a keyword recognition model that is the same as or different from the keyword recognition model of the first keyword recognition module 525. According to an embodiment, the second keyword recognition module 535 may substitute the user input into the keyword recognition model to calculate a second score $SCORE_{KW2}$. According to an embodiment, when the second score $SCORE_{KW2}$ is not less than a second reference value $Th_{KW2}$, the second keyword recognition module 535 may determine that the received user input includes a specified word. The second score $SCORE_{KW2}$ may be calculated differently for each used recognition algorithm, and for example, the second score may be a recognition confidence level.

According to an embodiment, methods of calculating scores of the first keyword recognition module 525 and the second keyword recognition module 535 may be different from each other. For example, the first keyword recognition module 525 and the second keyword recognition module 535 may use different algorithms (e.g., algorithms that use feature vectors of different dimensions) for calculating scores. In the case where a GMM algorithm or a HMM algorithm is used, the number of phoneme units may be different and an acoustic model corresponding to the phoneme unit may be different. In addition, in the case where a neural network is used, the number of nodes may be different and a network structure may be different. As another example, the first keyword recognition module 525 and the second keyword recognition module 535 may use the same algorithm and may have different amounts of calculation. In the case where the HMM algorithm is used, a search range for recognizing a specified word may be made different, and then the calculation amount may be made different. As another example, the first keyword recognition module 525 may use the same algorithm and may make a reference value different.

According to an embodiment, the second keyword recognition module 535 may have a recognition rate higher than the first keyword recognition module 525. For example, the second keyword recognition module 535 may process computations more complex than the first keyword recognition module 525. For example, the second keyword recognition module 535 may recognize a specified word by using a recognition algorithm that extracts only a specified word based on viterbi decoding. In the case where the second keyword recognition module 535 uses the algorithm, the second keyword recognition module 535 may reduce an error associated with a specified word.

According to an embodiment, the first speaker recognition model database 537 may store a speaker recognition model (speaker model) for recognizing a user input of a specified speaker. According to an embodiment, the first speaker recognition model database 537 may be implemented with the memory 150 of FIG. 2.

According to an embodiment, the first speaker recognition module 539 may determine whether a first user utterance is an utterance of a specified speaker. The first speaker recognition module 539 may receive the first data received from the DSP 520. The first speaker recognition module 539 may calculate a third score $SCORE_{SPK1}$ of the first data based on the speaker recognition model stored in the first speaker recognition model database 537. The first speaker recognition module 539 may compare the third score $SCORE_{SPK1}$ with each of a third reference value $Th_{SPK1}$ and a fourth reference value $Th_{SPK2}$ to determine whether a user input is an utterance of a specified speaker. Determining the third reference value $Th_{SPK1}$ and the fourth reference value $Th_{SPK2}$ is described in more detail below, with reference to FIG. 6. Continuing with FIG. 5, for example, the first speaker recognition module 539 may determine whether the user input is an utterance of a specified speaker, by Equation 3 using a universal background model-Gaussian mixture model (UBM-GMM)-based recognition algorithm.

$$SCORE_{SPK1} = \log\left(\frac{P(X \mid \lambda_{SPK1})}{P(X \mid \lambda_{UBM})}\right) \quad \text{[Equation 3]}$$

$$\begin{cases} \text{Fail} & \text{if } SCORE_{SPK1} < Th_{SPK1} \\ \text{Server decision} & \text{if } Th_{SPK1} \leq SCORE_{SPK1} < Th_{SPK2} \\ \text{Success} & \text{if } Th_{SPK2} \leq SCORE_{SPK1} \end{cases}$$

The $\lambda_{SPK1}$ may be the speaker recognition model of the specified speaker, and the $\lambda_{UBM}$ may be a background model. The speaker recognition model may be generated by using the statistical characteristic of a feature vector extracted from reference utterance (e.g., initially entered utterance) of the specified speaker. For example, the statistical characteristic may indicate the distribution of a difference value between a feature vector extracted from the reference utterance of the specified speaker and the feature vector of a plurality of utterances of the specified speaker. The background model may be a specified distribution of noise other than a user utterance. The background model may be a statistical model of utterances of other people that is other than the specified speaker. According to an embodiment, the first speaker recognition module 539 may substitute the user input into each of the speaker recognition model and the general model to calculate the third score $SCORE_{SPK1}$ by using the calculated value. The third score $SCORE_{SPK1}$ may be calculated differently for each used recognition algorithm, and for example, the third score may be a recognition confidence level. According to an embodiment, with reference to FIG. 6, when the third score $SCORE_{SPK1}$ is not less than the fourth reference value $Th_{SPK2}$, the first speaker recognition module 539 may determine that the received user input is the utterance of the specified speaker. When the third score $SCORE_{SPK1}$ is not greater than the third reference value $Th_{SPK1}$, the first speaker recognition module 539 may determine that the received user input is not the utterance of the specified speaker. Furthermore, when the third score $SCORE_{SPK1}$ is not less than the third reference value $Th_{SPK1}$ and is not greater than the fourth reference value $Th_{SPK2}$, the first speaker recognition module 539 may determine that the received user input is the utterance of the specified speaker and may wait for receiving information about the first data from the intelligent server 600. The first speaker recognition module 539 may receive the information to determine whether the user input is the utterance of the specified speaker.

According to another embodiment, the user terminal 500 may determine the third score $SCORE_{SPK1}$ based on one reference value of the third reference value $Th_{SPK1}$ and the fourth reference value $Th_{SPK2}$. For example, in the case where the third score $SCORE_{SPK1}$ is not greater than the one reference value, the user terminal 500 may determine that the user input is not the utterance of the specified speaker. In the case where the third score $SCORE_{SPK1}$ is not less than the one reference value, the user terminal 500 may determine that the user input is the utterance of the specified speaker.

As such, in the case where it is recognized that the user terminal 500 receives a first user utterance including a specified word of a specified speaker, the state of the user terminal 500 may be changed from a standby state to an operating state. In other words, the user terminal 500 may determine whether to activate a voice-based input system, based on the determination. The user terminal 500 may launch a dedicated application (e.g., a speech recognition app) for processing user utterances and may process a second user input to generate a command (e.g., path rule) for a voice command.

According to an embodiment, the first speaker recognition module 539 may use a deep neural network (DNN)-based recognition algorithm or a multi-neural network-based recognition algorithm. The multi-neural network-based recognition algorithm may determine the keyword recognition result, i.e., the success or failure of recognition, through a neural network in which a hidden layer is present.

Figure 6:
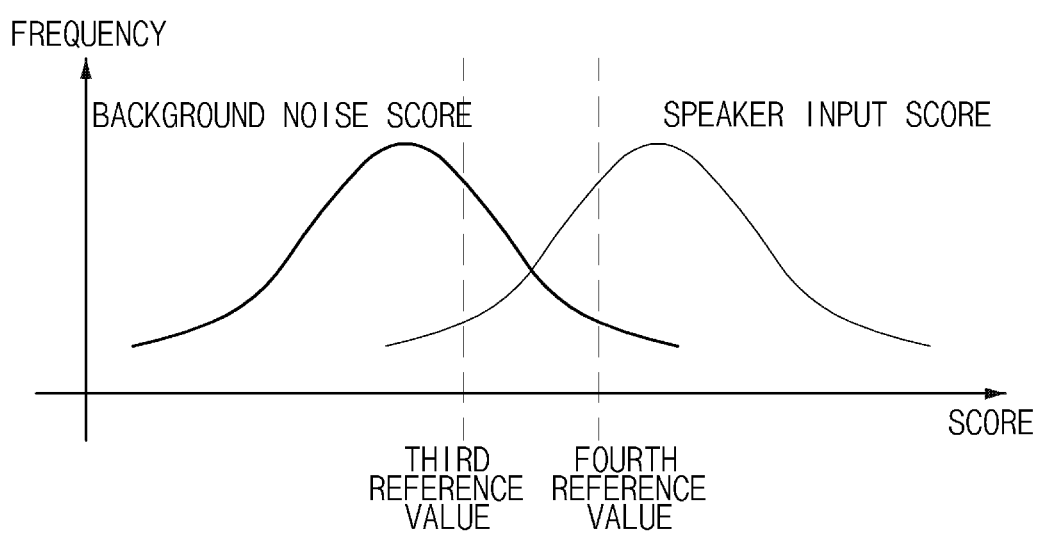
FIG. 6 is a graph illustrating a method of determining a reference value for recognizing a speaker of a user terminal, according to an embodiment.

FIG. 6 is a graph illustrating a method of determining a reference value for recognizing a speaker of a user terminal, according to an embodiment.

Referring to FIG. 6, the first speaker recognition module 539 may generate the distribution of scores of a plurality of user utterances by using the speaker recognition model and the background model and may determine the third reference value $Th_{SPK1}$ and the fourth reference value $Th_{SPK2}$ based on the first speaker recognition module 539. As such, the first speaker recognition module 539 may determine whether a specified word is included in a user utterance, by using the third reference value $Th_{SPK1}$ and the fourth reference value $Th_{SPK2}$.

Referring to FIG. 5, the intelligence server 600 may include a pre-processing module 610, an ASR module 620, a path rule generating module 630, a second speaker recognition model database 640, a second speaker recognition module 650, or any combination thereof.

According to an embodiment, the pre-processing module 610 may receive first data from the user terminal 500 and may perform pre-processing on the first data. According to an embodiment, the pre-processing module 610 may transmit the pre-processed first data to the ASR module 620 and the second speaker recognition module 650.

According to an embodiment, the ASR module 620 may change the first data to text data (or text). The ASR module 620 may be similar to the ASR module 210 of FIG. 4. For example, the ASR module 620 may convert the first data to text data by using acoustic model, a language model, and information about large vocabulary speech recognition, which are stored in an ASR DB 621.

According to an embodiment, the ASR module 620 may transmit the text data associated with the first data to the path rule generating module 630. Furthermore, the ASR module 620 may transmit the text data to the user terminal 500. For example, in the case where a user input corresponding to the first data includes only a specified word, the ASR module 620 may transmit the text data associated with the first data to the user terminal 500. As another example, in the case where the user input corresponding to the first data includes an input to generate a command (e.g., path rule) for a voice command as well as a specified word, the ASR module 620 may transmit the text data corresponding to the specified word to the user terminal 500 and may transmit the remaining text data to the path rule generating module 630.

As such, the user terminal 500 may determine whether a specified word is included in the user input, based at least partly on the first data or may determine whether the user input is the utterance of a specified user.

According to an embodiment, the path rule generating module 630 may generate a path rule based on text data received from the ASR module 620. The path rule generating module 630 may be similar to the NLU module 220 and the path planner module 230 of FIG. 4. According to an embodiment, the path rule generating module 630 may transmit the path rule corresponding to the user input to the user terminal 500.

According to an embodiment, the second speaker recognition model database 640 may store a speaker recognition model for recognizing the user input of the specified speaker. The second speaker recognition model database 640 may store the speaker recognition model of a plurality of specified speakers, different from the first speaker recognition model database 537. As such, the intelligence server 600 may recognize the plurality of specified speakers by using the plurality of speaker recognition model.

According to an embodiment, the second speaker recognition module 650 may determine whether a first user utterance corresponding to the first data is the utterance of the specified speaker. The second speaker recognition module 650 may determine whether the user utterance is the utterance of the specified speaker, similarly to the first speaker recognition module 539. In other words, the second speaker recognition module 650 may determine whether the user utterance is the utterance of the specified speaker, by using the speaker recognition model stored in the second speaker recognition model database 640. For example, the second speaker recognition module 650 may receive information of a user from the user terminal 500 and may select a speaker recognition model corresponding to the user information to determine whether the user utterance is the utterance of the specified speaker. The second speaker recognition module 650 may recognize a speaker in a manner different from that of the first speaker recognition module 539. As such, the second speaker recognition module 650 may transmit the analyzed speaker recognition information to the user terminal 500.

According to an embodiment, the user terminal 500 may receive information about the user input from the intelligence server 600. For example, the user terminal 500 may receive text data from the intelligence server 600. The AP 530 of the user terminal 500 may determine whether the text data includes a specified word (third determination). For another example, the user terminal 500 may receive speaker recognition information from the intelligence server 600. The AP 530 of the user terminal 500 may determine whether the first user utterance is the utterance of a specified user, with reference to the speaker recognition information. As such, the user terminal 500 may make the determination for changing the state of the user terminal 500 to an operating state, by using the text data or the speaker recognition information.

As such, when receiving the first user utterance for changing the state of the user terminal 500, the user terminal 500 may determine whether the first user utterance includes the specified word of the specified speaker in the DSP 520, the AP 530 and the intelligence server 600, thereby reducing an error associated with the user input.

Figure 7:
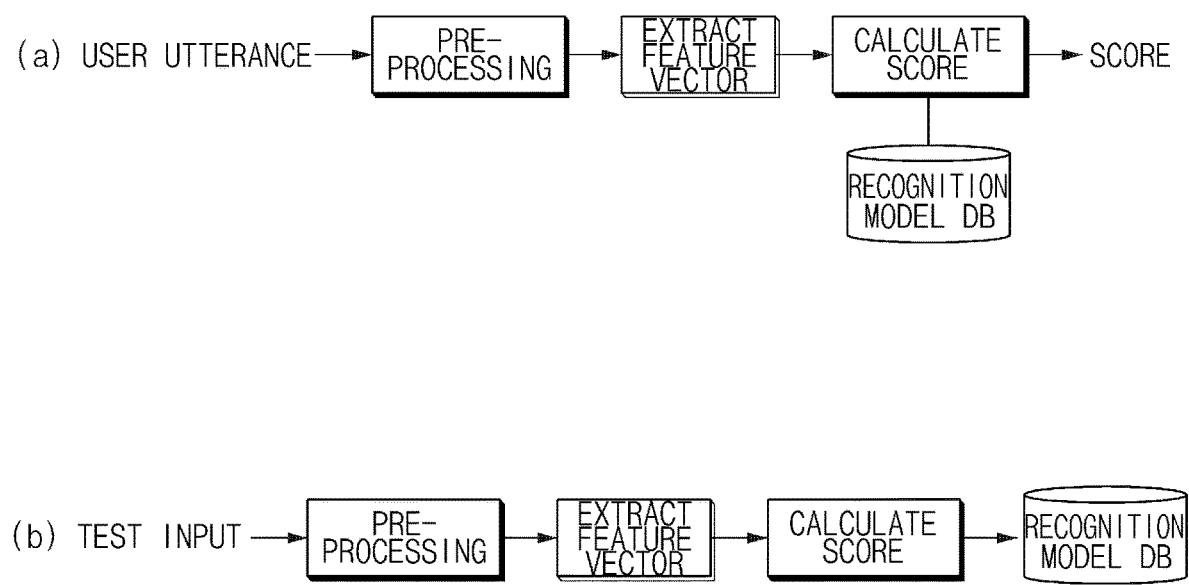
FIG. 7 is a drawing illustrating a method of training a keyword recognition model and a speaker recognition model of a user terminal, according to an embodiment.

FIG. 7 is a drawing illustrating a method of training a keyword recognition model and a speaker recognition model of a user terminal, according to an embodiment.

Referring to FIG. 7, the user terminal 500 (or the intelligence server 600) may train a keyword recognition model and a speaker recognition model. For example, the user terminal 500 may receive a user utterance for training a keyword recognition model (e.g., keyword recognition model for the first keyword recognition module 525 and the second keyword recognition module 535) and a speaker recognition model.

According to an embodiment, the user terminal 500 may repeatedly receive the user utterance and may train a recognition model. For example, in the case where a reference recognition model, for recognizing the speaker or the keyword, is stored in database 523, 533, or 537, the user terminal 500 may train the keyword recognition model by refining the reference recognition model by using the feature vector of the reference recognition model to store the refined recognition model in the database 523, 533, or 537. As another example, in the case where the reference recognition model is not set in advance, after receiving a user utterance for setting the recognition model to extract the feature vector of the user utterance, the user terminal 500 may generate the recognition model based on the feature vector to store the generated recognition model in the database 523, 533, or 537.

According to an embodiment, when training the recognition model, the user terminal 500 may receive the recognition result of a user input for the training via the intelligence server 600. For example, the user terminal 500 may receive text data corresponding to the user input via the ASR module 620 of the intelligence server 600. As another example, the user terminal 500 may receive the speaker recognition result corresponding to the user input via the second speaker recognition module 650 of the intelligence server 600. According to an embodiment, the user terminal 500 may train a model by using the recognition result of the user input. For example, the user terminal 500 may compare text data of a specified word stored in a non-transitory memory with text data received from the intelligence server 600. For example, in the case where the text data of the specified word is the same as the text data received from the intelligence server 600, the user terminal 500 may train the recognition model by using the received user utterance. For example, in the case where the text data of the specified word is different from the text data received from the intelligence server 600, the user terminal 500 may recognize the user input as an incorrect user utterance and may guide a user to enter a user utterance again. According to an embodiment, the user terminal 500 may store the recognition result in a database and may use the recognition result to recognize a user input.

As such, the user terminal 500 may compare the trained keyword recognition model and the trained speaker recognition model with the feature vector of a user input to determine a user input including a specified word of a specified speaker, thereby reducing an error.

According to an embodiment, the user may set a user input to a specified word for changing the state of the user terminal 500. For example, the user terminal 500 may set a new word to a specified word (e.g., change "bixby wake up!" to "bixby MichealMicheal!"). The user terminal 500 may set a first user input associated with the set new word to the reference feature vector of a specified word. As another example, the user terminal 500 may add a new word to a preset word (e.g., "bixby") to change to "bixby Micheal!" for the purpose of setting a specified word. The user terminal 500 may allow the DSP 520 to recognize a preset word (e.g., "bixby!") and may allow the AP 530 and the intelligence server 600 to recognize the added word (e.g., "bixby Micheal!"). The added word as well as the specified word may be recognized through the large vocabulary speech recognition of the second keyword recognition module 535 of the AP 530 and the ASR module 620 of the intelligence server 600. As such, the user terminal 500 may prevent the recognition of the utterance of another person that is not the specified speaker and may set a specified word so as to be suitable for the performance of a configuration for recognizing a user utterance, thereby reducing an error.

Figure 8A:
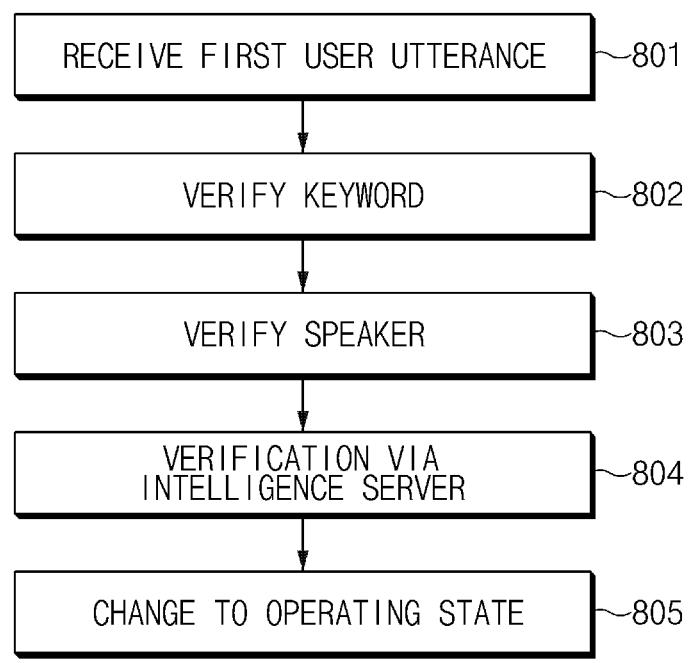
FIG. 8A is a flowchart illustrating a method in which a state of a user terminal is changed to an operating state, according to an embodiment.

FIG. 8A is a flowchart illustrating a method in which a state of a user terminal is changed to an operating state, according to an embodiment.

Referring to FIG. 8A, in the case where the user terminal 500 receives a user instruction including a specified word of a specified speaker, wherein the state of the user terminal 500 may be changed to an operating state.

According to an embodiment, in operation 801, the microphone 510 of the user terminal 500 may receive a first user utterance. The first user utterance may be a user input for changing the state of the user terminal 500 from a standby state to the operating state.

According to an embodiment, in operation 802, the DSP 520 or the AP 530 of the user terminal 500 may determine whether the first user utterance includes the specified word (or keyword).

According to an embodiment, in operation 803, the user terminal 500 (e.g., the AP 530) may determine whether the first user utterance is the utterance of the specified speaker.

According to an embodiment, in operation 804, the user terminal 500 (e.g., the AP 530) may receive information corresponding to the first user utterance from the intelligence server 600 and may determine, based on the information, whether the first user utterance is the utterance of the specified speaker including the specified word.

According to an embodiment, in operation 805, the state of the user terminal 500 (e.g., the AP 530) may be changed to the operating state for processing a second user utterance for generating a path rule.

Figure 8B:
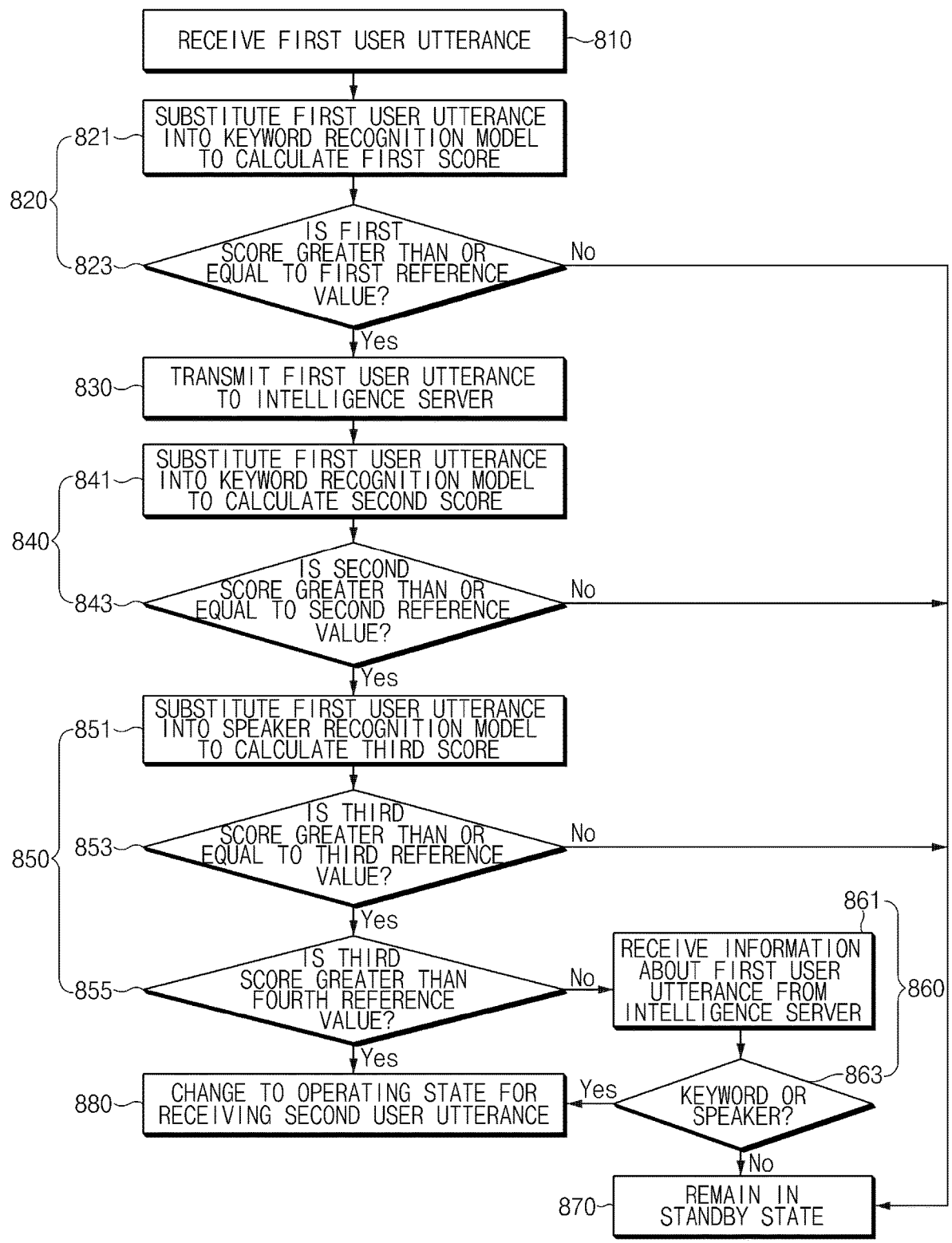
FIG. 8B is a flowchart illustrating a method in which a state of a user terminal is changed to an operating state, according to an embodiment.

FIG. 8B is a flowchart illustrating a method in which a state of a user terminal is changed to an operating state, according to an embodiment.

Referring to FIG. 8B, the user terminal 500 may sequentially recognize a user utterance to activate a configuration for operating the user terminal 500 and then may activate the configuration.

According to an embodiment, in operation 810, the user terminal 500 may receive a first user utterance.

According to an embodiment, in operation 820, the user terminal 500 (e.g., the DSP 520) may determine whether the first user utterance includes a specified word (the first determination). According to an embodiment, in operation 821, the user terminal 500 may substitute the feature vector of the first user utterance into the keyword recognition model of the specified word to calculate the first score $SCORE_{KW1}$. According to an embodiment, in operation 823, the user terminal 500 may determine whether the first score $SCORE_{KW1}$ is not less than the first reference value $Th_{KW1}$. In the case where the first score $SCORE_{KW1}$ is not less than the first reference value $Th_{KW1}$, the flow moves to operation 830. In the case where the first score $SCORE_{KW1}$ is less than the first reference value $Th_{KW1}$, the flow moves to operation 870, where the user terminal 500 may remain in a standby state.

According to an embodiment, in operation 830, the user terminal 500 (e.g., the AP 530) may transmit the first user utterance to the intelligence server 600. For example, the user terminal 500 may transmit first data corresponding to the first user utterance to the intelligence server 600.

According to an embodiment, in the case where the first score $SCORE_{KW1}$ is not less than the first reference value $Th_{KW1}$, in operation 840, the user terminal 500 (e.g., the AP 530) may determine whether the first user utterance includes a specified word (the second determination). According to an embodiment, in operation 841, the user terminal 500 may substitute the feature vector of the first user utterance into the keyword recognition model of the specified word to calculate the second score $SCORE_{KW2}$. According to an embodiment, in operation 843, the user terminal 500 may determine whether the second score $SCORE_{KW2}$ is not less than the second reference value $Th_{KW2}$. In the case where the second score $SCORE_{KW2}$ is not less than the second reference value $Th_{KW1}$, the flow moves to operation 850. In the case where the second score $SCORE_{KW2}$ is less than the second reference value $Th_{KW2}$, the flow moves to operation 870, where the user terminal 500 may remain in the standby state.

According to an embodiment, in the case where the second score $SCORE_{KW2}$ is not less than the second reference value $Th_{KW2}$, in operation 850, the user terminal 500 (e.g., the AP 530) may determine whether the first user utterance is the utterance of the specified speaker. According to an embodiment, in operation 851, the user terminal 500 may substitute the feature vector of the first user utterance into the speaker recognition model of the specified speaker to calculate the third score $SCORE_{SPK1}$. According to an embodiment, in operation 853, the user terminal 500 may determine whether the third score $SCORE_{SPK1}$ is not less than the third reference value $Th_{SPK1}$. In the case where the third score $SCORE_{SPK1}$ is less than the third reference value $Th_{SPK1}$, in operation 870, the user terminal 500 may remain in the standby state. According to an embodiment, in the case where the third score $SCORE_{SPK1}$ is not less than the third reference value $Th_{SPK1}$, in operation 855, the user terminal 500 may determine whether the third score $SCORE_{SPK1}$ exceeds the fourth reference value $Th_{SPK2}$. In the case where the third score $SCORE_{SPK1}$ is not greater than the fourth reference value $Th_{SPK2}$, in operation 860, the user terminal 500 may determine whether the first user utterance is the utterance of the specified speaker, based on information about the first user utterance received from the intelligence server 600.

According to an embodiment, in operation 860, the user terminal 500 (e.g., the AP 530) may determine whether the first user utterance includes specified word or whether the first user utterance is the utterance of the specified speaker, based on the information about the first user utterance received from the intelligence server 600.

According to an embodiment, in operation 861, the user terminal 500 may receive the information about the first user utterance from the intelligence server 600. For example, the user terminal 500 may wait for a specified or predefined period of time (e.g., 1.3 to 2 sec) from the point in time when the user terminal 500 transmits the first data (e.g., operation 830) to the point of receiving the information about the first user utterance. According to an embodiment, when the information about the first user utterance is not received from an intelligence server within the specified or predefined period of time (e.g., 1.3 to 2 sec), the user terminal 500 may determine whether the user input is the utterance of the specified speaker based on one reference value selected among the third reference value $Th_{SPK1}$ and the fourth reference value $Th_{SPK2}$. The user terminal 500 may determine whether the specified or predefined period of time has elapsed since the first data is transmitted to the intelligence server 600 (e.g., operation 830). For example, in the case where the third reference value $Th_{SPK1}$ is selected as one reference value, the user terminal 500 may recognize the user input as the utterance of a specified speaker. The third reference value $Th_{SPK1}$ may be a recognition reference value. As another example, in the case where the fourth reference value $Th_{SPK2}$ is selected as one reference value, the user terminal 500 may not recognize the user input as the utterance of a specified speaker. The fourth reference value $Th_{SPK2}$ may be a rejection reference value. According to another embodiment, in the case where the user terminal 500 recognizes a specified speaker by using one reference value, when the information about the first user utterance is not received from an intelligence server within a specified or predefined period of time, the user terminal 500 may determine whether the user input is the utterance of the specified speaker based on the one reference value.

According to an embodiment, in operation 863, the user terminal 500 may determine whether the first user utterance includes a specified word or is the utterance of the specified speaker (the third determination). For example, the user terminal 500 may receive information about the first user utterance from the intelligence server 600 within a specified or predefined period of time to determine whether the first user utterance includes a specified word or is the utterance of the specified speaker. In the case where the first user utterance does not include a specified word or is not the utterance of the specified speaker, in operation 870, the user terminal 500 may remain in a standby state.

According to an embodiment, in the case where the third score $SCORE_{SPK1}$ exceeds the fourth reference value $Th_{SPK2}$, in the case where the first user utterance includes a specified word, or in the case where the first user utterance is the utterance of the specified speaker, in operation 880, the state of the user terminal 500 may be changed to an operating state for receiving a second user input to generate a command (e.g., path rule) for a voice command.

According to another embodiment, in the case where the second score $SCORE_{KW2}$ is not less than the second reference value $Th_{KW2}$, the user terminal 500 (e.g., the AP 530) may transmit the first user utterance to the intelligence server 600, instead of operation 830. Alternatively, in the case where the third score $SCORE_{SPK1}$ exceeds the fourth reference value $Th_{SPK2}$, the user terminal 500 (e.g., the AP 530) may transmit the first user utterance to the intelligence server 600, instead of operation 830. As such, the user terminal 500 may determine whether the specified or predefined period of time (e.g., 1.3 to 2 sec) has elapsed since the first data is transmitted.

According to another embodiment, in the case where the DSP 520 recognizes the specified word of the first user utterance, the user terminal 500 may transmit the first data generated based on the first user utterance to the intelligence server 600 and may receive information associated with the first data to change the state of the user terminal 500 to the operating state. In other words, the user terminal 500 may recognize the first user utterance through the DSP 520 and the intelligence server 600 and may activate the AP 530.

Various embodiments of the present disclosure through FIGS. 1 to 8B may determine whether a specified word is included in a user utterance for changing the state of the user terminal 500 from a standby state to an operating state and whether the user utterance is the utterance of the specified speaker, thereby preventing the incorrect recognition of the user utterance.

According to various embodiments, an electronic apparatus may include a housing, a speaker disposed at a first portion of the housing, a microphone disposed at a second portion of the housing, a communication circuit disposed in or attached to the housing, a digital signal processing (DSP) circuit disposed in the housing and electrically connected to the microphone, a processor disposed in the housing and operatively connected to the speaker, the DSP circuit, and the communication circuit, and a non-transitory memory disposed in the housing and operatively connected to the processor. While a voice-based input system is in a standby state, the DSP circuit may be configured to receive first data associated with a user utterance received via the microphone, to make a first determination on whether the first data includes a specified word, and to provide the first data to the processor. The memory may store one or more instructions which, when executed, cause the processor to receive the first data from the DSP circuit, to make a second determination on whether the first data includes the specified word, to transmit the first data to an external server via the communication circuit, to receive a text generated from the first data by the external server via the communication circuit, to make a third determination on whether the received text matches the specified word, and to determine whether to activate the voice-based input system based on the third determination.

According to various embodiments, the instructions may cause the processor to identify a user based at least partly on the first data.

According to various embodiments, the electronic apparatus may be a mobile device and the processor may include an application processor (AP).

According to various embodiments, the user utterance may include a plurality of words, and the DSP circuit may be configured to make the first determination based on part, but not all (e.g., a subset), of the plurality of words.

According to various embodiments, the one or more instructions may cause the processor to wait for receiving the text for a specified or predefined period of time and to determine whether to activate the voice-based input system based on the second determination without making the third determination when the text is not received within the specified or predefined period of time.

According to various embodiments, the DSP circuit may be configured to process the first data and the specified word in a first method to calculate a first value and to make the first determination when the first value exceeds a first reference value.

According to various embodiments, the first method may calculate a feature vector of a user utterance corresponding to the first data and may substitute the calculated feature vector of the user utterance into a keyword recognition model that is generated based on the feature vector of the specified word in order to calculate the first value.

According to various embodiments, the keyword recognition model may be generated by comparing the feature vector of the specified word with a feature vector of a user utterance obtained by repeatedly entering the specified word.

According to various embodiments, the one or more instructions may cause the processor to process the first data and the specified word in a second method to calculate a second value and to make the second determination when the second value exceeds a second reference value.

According to various embodiments, the first method and the second method may be different from each other or may be the same as each other, and the first reference value and the second reference value may be different from each other.

According to various embodiments, an electronic apparatus may include a housing, a speaker disposed at a first portion of the housing, a microphone disposed at a second portion of the housing, a communication circuit disposed in or attached to the housing, a DSP circuit disposed in the housing and electrically connected to the microphone, a processor disposed in the housing and operatively connected to the speaker, the DSP circuit, and the communication circuit, and a non-transitory memory disposed in the housing and operatively connected to the processor. While a voice-based input system is in a standby state, the DSP circuit may be configured to receive first data associated with a user utterance received via the microphone, to make a first determination on whether the first data includes a specified word, and to provide the first data to the processor. The memory may store one or more instructions which, when executed, cause the processor to receive the first data from the DSP circuit, to make a second determination on whether the first data includes the specified word, to transmit the first data to an external server via the communication circuit, to receive a text generated from the first data by the external server via the communication circuit within a specified or predefined period of time, to make a third determination on whether the received text matches the specified word, and to determine whether to activate the voice-based input system, based on the third determination.

According to various embodiments, the one or more instructions may cause the processor to identify a user based at least partly on the first data.

According to various embodiments, the electronic apparatus may be a mobile device and the processor may include an AP.

According to various embodiments, the user utterance may include a plurality of words, and the DSP circuit may be configured to make the first determination based on part, but not all (e.g., a subset), of the plurality of words.

According to various embodiments, the DSP circuit may be configured to process the first data and the specified word in a first method to calculate a first value and to make the first determination when the first value exceeds a first reference value.

According to various embodiments, the first method may calculate a feature vector of a user utterance corresponding to the first data and may substitute the calculated feature vector of the user utterance into a keyword recognition model that is generated based on the feature vector of the specified word in order to calculate the first value.

According to various embodiments, the keyword recognition model may be generated by comparing the feature vector of the specified word with a feature vector of a user utterance obtained by repeatedly entering the specified word.

According to various embodiments, the one or more instructions may cause the processor to process the first data and the specified word in a second method to calculate a second value and to make the second determination when the second value exceeds a second reference value.

According to various embodiments, the first method and the second method may be different from each other or may be the same as each other, and the first reference value and the second reference value may be different from each other.

According to various embodiments, a method of recognizing a user utterance may include receiving first data associated with a user utterance received via a microphone, making a first determination on whether the user utterance includes the first data and a specified word via a DSP circuit, making a second determination on whether the first data includes the specified word via a processor, transmitting the first data to an external server via a communication circuit, receiving a text generated from the first data by the external server via the communication circuit, making a third determination on whether the received text matches with the specified word via the processor, and determining whether to activate the voice-based input system, based on the third determination.

Figure 9:
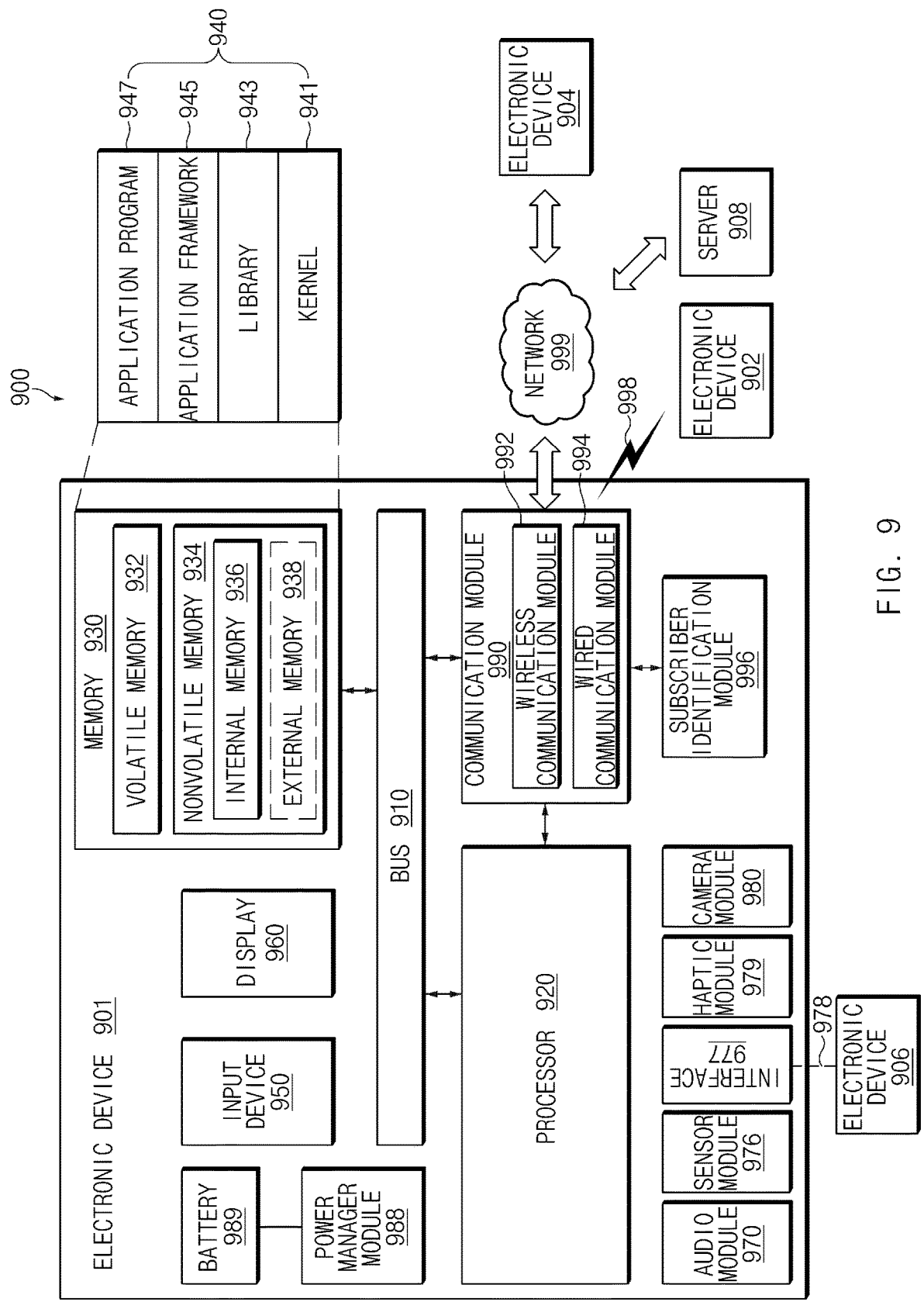
FIG. 9 illustrates a block diagram of an electronic apparatus in a network environment, according to various embodiments.

FIG. 9 illustrates a block diagram of an electronic apparatus 901 in a network environment 900, according to various embodiments. An electronic apparatus according to various embodiments of this disclosure may include various forms of devices. For example, the electronic apparatus may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic apparatus may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic apparatus may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic apparatus according to an embodiment of this disclosure may not be limited to the above-described devices, and may provide functions of a plurality of devices like smartphones which have measurement function of personal biometric information (e.g., heart rate or blood glucose). In this disclosure, the term "user" may refer to a person who uses an electronic apparatus or may refer to a device (e.g., an artificial intelligence electronic apparatus) that uses the electronic apparatus.

Referring to FIG. 9, under the network environment 900, the electronic apparatus 901 may communicate with an electronic apparatus 902 through local wireless communication 998 or may communication with an electronic apparatus 904 or a server 908 through a network 999. According to an embodiment, the electronic apparatus 901 may communicate with the electronic apparatus 904 through the server 908.

According to an embodiment, the electronic apparatus 901 may include a bus 910, a processor 920, a non-transitory memory 930, an input device 950 (e.g., a micro-phone or a mouse), a display device 960, an audio module 970, a sensor module 976, an interface 977, a haptic module 979, a camera module 980, a power management module 988, a battery 989, a communication module 990, and a subscriber identification module 996. According to an embodiment, the electronic apparatus 901 may not include at least one (e.g., the display device 960 or the camera module 980) of the above-described elements or may further include other element(s).

The bus 910 may interconnect the above-described elements 920 to 990 and may include a circuit for conveying signals (e.g., a control message or data) between the above-described elements.

The processor 920 may include one or more of a central processing unit (CPU), an application processor (AP), a graphic processing unit (GPU), an image signal processor (ISP) of a camera or a communication processor (CP). According to an embodiment, the processor 920 may be implemented with a system on chip (SoC) or a system in package (SiP). For example, the processor 920 may drive an operating system (OS) or an application program to control at least one of another element (e.g., hardware or software element) of the electronic apparatus 901 connected to the processor 920 and may process and compute various data. The processor 920 may load a command or data, which is received from at least one of other elements (e.g., the communication module 990), into a volatile memory 932 to process the command or data and may store the result data into a nonvolatile memory 934.

The non-transitory memory 930 may include, for example, the volatile memory 932 or the nonvolatile memory 934. The volatile memory 932 may include, for example, a random access memory (RAM) (e.g., a dynamic RAM (DRAM), a static RAM (SRAM), or a synchronous DRAM (SDRAM)). The nonvolatile memory 934 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 934 may be configured in the form of an internal memory 936 or the form of an external memory 938 which is available through connection only if necessary, according to the connection with the electronic apparatus 901. The external memory 938 may further include a flash drive such as compact flash (CF), secure digital (SD), micro secure digital (Micro-SD), mini secure digital (Mini-SD), extreme digital (xD), a multimedia card (MMC), or a memory stick. The external memory 938 may be operatively or physically connected with the electronic apparatus 901 in a wired manner (e.g., a cable or a universal serial bus (USB)) or a wireless (e.g., Bluetooth) manner.

For example, the non-transitory memory 930 may store, for example, at least one different software element, such as a command or data associated with the program 940, of the electronic apparatus 901. The program 940 may include, for example, a kernel 941, a library 943, an application framework 945 or an application program (interchangeably, "application") 947.

The input device 950 may include a microphone, a mouse, or a keyboard. According to an embodiment, the keyboard may include a keyboard physically connected or a virtual keyboard displayed through the display device 960.

The display device 960 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic apparatus 901.

The audio module 970 may convert, for example, from a sound into an electrical signal or from an electrical signal into the sound. According to an embodiment, the audio module 970 may acquire sound through the input device 950 (e.g., a microphone) or may output sound through an output device (not illustrated) (e.g., a speaker or a receiver) included in the electronic apparatus 901, an external electronic apparatus (e.g., the electronic apparatus 902 (e.g., a wireless speaker or a wireless headphone)) or an electronic apparatus 906 (e.g., a wired speaker or a wired headphone) connected with the electronic apparatus 901

The sensor module 976 may measure or detect, for example, an internal operating state (e.g., power or temperature) of the electronic apparatus 901 or an external environment state (e.g., an altitude, a humidity, or brightness) to generate an electrical signal or a data value corresponding to the information of the measured state or the detected state. The sensor module 976 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 976 may further include a control circuit for controlling at least one or more sensors included therein. According to an embodiment, the electronic apparatus 901 may control the sensor module 976 by using the processor 920 or a processor (e.g., a sensor hub) separate from the processor 920. In the case that the separate processor (e.g., a sensor hub) is used, while the processor 920 is in a sleep state, the separate processor may operate without awakening the processor 920 to control at least a portion of the operation or the state of the sensor module 976.

According to an embodiment, the interface 977 may include a high definition multimedia interface (HDMI), a universal serial bus (USB), an optical interface, a recommended standard 232 (RS-232), a D-subminiature (D-sub), a mobile high-definition link (MI-IL) interface, a SD card/MMC (multi-media card) interface, or an audio interface. A connector 978 may physically connect the electronic apparatus 901 and the electronic apparatus 906. According to an embodiment, the connector 978 may include, for example, an USB connector, an SD card/MMC connector, or an audio connector (e.g., a headphone connector).

The haptic module 979 may convert an electrical signal into mechanical stimulation (e.g., vibration or motion) or into electrical stimulation. For example, the haptic module 979 may apply tactile or kinesthetic stimulation to a user. The haptic module 979 may include, for example, a motor, a piezoelectric element, or an electric stimulator.

The camera module 980 may capture, for example, a still image and a moving picture. According to an embodiment, the camera module 980 may include at least one lens (e.g., a wide-angle lens and a telephoto lens, or a front lens and a rear lens), an image sensor, an image signal processor, or a flash (e.g., a light emitting diode or a xenon lamp).

The power management module 988, which is to manage the power of the electronic apparatus 901, may constitute at least a portion of a power management integrated circuit (PMIC).

The battery 989 may include a primary cell, a secondary cell, or a fuel cell and may be recharged by an external power source to supply power at least one element of the electronic apparatus 901.

The communication module 990 may establish a communication channel between the electronic apparatus 901 and an external device (e.g., the first external electronic apparatus 902, the second external electronic apparatus 904, or the server 908). The communication module 990 may support wired communication or wireless communication through the established communication channel. According to an embodiment, the communication module 990 may include a wireless communication module 992 or a wired communication module 994. The communication module 990 may communicate with the external device through a first network 998 (e.g. a wireless local area network such as Bluetooth or infrared data association (IrDA)) or a second network 999 (e.g., a wireless wide area network such as a cellular network) through a relevant module among the wireless communication module 992 or the wired communication module 994.

The wireless communication module 992 may support, for example, cellular communication, local wireless communication, global navigation satellite system (GNSS) communication. The cellular communication may include, for example, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a Global Positioning System (GPS), a Global Navigation Satellite System (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 992 supports cellar communication, the wireless communication module 992 may, for example, identify or authenticate the electronic apparatus 901 within a communication network using the subscriber identification module (e.g., a SIM card) 996. According to an embodiment, the wireless communication module 992 may include a communication processor (CP) separate from the processor 920 (e.g., an application processor (AP)). In this case, the communication processor may perform at least a portion of functions associated with at least one of elements 910 to 996 of the electronic apparatus 901 in substitute for the processor 920 when the processor 920 is in an inactive (sleep) state, and together with the processor 920 when the processor 920 is in an active state. According to an embodiment, the wireless communication module 992 may include a plurality of communication modules, each supporting only a relevant communication scheme among cellular communication, local wireless communication, or a GNSS communication.

The wired communication module 994 may include, for example, a local area network (LAN) service, a power line communication, or a plain old telephone service (POTS).

For example, the first network 998 may employ, for example, Wi-Fi direct or Bluetooth for transmitting or receiving commands or data through wireless direct connection between the electronic apparatus 901 and the first external electronic apparatus 902. The second network 999 may include a telecommunication network (e.g., a computer network such as a LAN or a WAN, the Internet or a telephone network) for transmitting or receiving commands or data between the electronic apparatus 901 and the second electronic apparatus 904.

According to various embodiments, the commands or the data may be transmitted or received between the electronic apparatus 901 and the second external electronic apparatus 904 through the server 908 connected with the second network 999. Each of the first and second external electronic apparatuses 902 and 904 may be a device of which the type is different from or the same as that of the electronic apparatus 901. According to various embodiments, all or a part of operations that the electronic apparatus 901 will perform may be executed by another or a plurality of electronic apparatuses (e.g., the electronic apparatuses 902 and 904 or the server 908). According to an embodiment, in the case that the electronic apparatus 901 executes any function or service automatically or in response to a request, the electronic apparatus 901 may not perform the function or the service internally, but may alternatively or additionally transmit requests for at least a part of a function associated with the electronic apparatus 901 to any other device (e.g., the electronic apparatus 902 or 904 or the server 908). The other electronic apparatus (e.g., the electronic apparatus 902 or 904 or the server 908) may execute the requested function or additional function and may transmit the execution result to the electronic apparatus 901. The electronic apparatus 901 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the non-transitory memory 930).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the non-transitory memory 930) in the form of a program module. The instruction, when executed by a processor (e.g., the processor 920), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted, or other sub-elements may be further included. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic apparatus comprising:
a speaker;
a microphone;
a communication circuit;
a digital signal processing (DSP) circuit electrically connected to the microphone;

a processor operatively connected to the speaker, the DSP circuit, and the communication circuit, wherein the DSP and the processor are implemented with a chip; and a memory operatively connected to the processor, wherein, while a voice-based input system is in a standby state, the DSP circuit is configured to:

receive first data associated with a user utterance that is received via the microphone;

perform a first determination to determine whether the first data includes a first part of a wakeup word to activate the voice-based input system; and when the first data includes the first part of the wakeup word, provide the first data to the processor, and wherein the memory stores one or more instructions which, when executed, cause the processor to:

receive the first data from the DSP circuit; perform a second determination to determine whether the first data includes the first part and a second part of the wakeup word and whether the user utterance is associated with a specified user, wherein the second part is different from the first part, after determining that the first data includes the first part and the second part of the wakeup word, detecting whether the user utterance is associated with the specified user by calculating an identity score based on the first data associated with the user utterance, and determining whether the identity score is greater than or equal to a first identification reference value and a second identification reference value, based on determining that the identity score is greater than or equal to the first identification reference value and the second identification reference value, activate the voice-based input system, and based on determining that the identity score is greater than or equal to the first identification reference value and less than the second identification reference value, retrieving user-related information from an external server to determine whether the user utterance is associated with the specified user.

2. The electronic apparatus of claim 1, wherein the one or more instructions cause the processor to:

when the first data includes the first part and the second part of the wakeup word, transmit the first data to an external server via the communication circuit;

receive, via the communication circuit, a text generated from the first data by the external server;

perform a third determination to determine whether the received text matches the wakeup word; and when the received text is determined to match the wakeup word, activate the voice-based input system.

3. The electronic apparatus of claim 2, wherein the one or more instructions cause the processor to:

wait for a predefined period of time for receiving the text from the external server; and when the text is not received within the predefined period of time, determine whether to activate the voice-based input system based on the second determination without performing the third determination.

4. The electronic apparatus of claim 1, wherein the electronic apparatus is a mobile device, wherein the processor includes an application processor (AP), and wherein when the identity score is greater than or equal to the first identification reference value and less than the second identification reference value, determining whether to activate the voice-based input system according to whether the retrieved user-related information indicates that the user utterance is associated with the specified user.

5. The electronic apparatus of claim 1, wherein the user utterance includes a plurality of words, and wherein the DSP circuit is configured to perform the first determination based at least in part on a subset of the plurality of words.

6. The electronic apparatus of claim 1, wherein the DSP circuit is configured to:

process the first data and the wakeup word in a first method to calculate a first value; and when the first value exceeds a first reference value, performing the first determination by the DSP circuit.

7. The electronic apparatus of claim 6, wherein the first method calculates a feature vector of the user utterance corresponding to the first data and substitutes the calculated feature vector of the user utterance into a keyword recognition model to calculate the first value; and wherein the keyword recognition model is generated based on the feature vector of the wakeup word.

8. The electronic apparatus of claim 7, wherein the keyword recognition model is generated by comparing the feature vector of the wakeup word with another feature vector of another user utterance that is obtained by repeatedly entering the wakeup word.

9. The electronic apparatus of claim 6, wherein the one or more instructions cause the processor to:

process the first data and the wakeup word in a second method to calculate a second value; and when the second value exceeds a second reference value, performing the second determination by the processor.

10. The electronic apparatus of claim 9, wherein the first method and the second method are different from each other or are the same as each other, and wherein the first reference value and the second reference value are different from each other.

11. An electronic apparatus comprising:

a speaker;

a microphone;

a communication circuit;

a DSP circuit electrically connected to the microphone;

a processor operatively connected to the speaker, the DSP circuit, and the communication circuit; wherein the DSP and the processor are implemented with a chip and a memory operatively connected to the processor, wherein, while a voice-based input system is in a standby state, the DSP circuit is configured to:

receive first data associated with a user utterance that is received via the microphone; perform a first determination to determine whether the first data includes a first part of a wakeup word to activate the voice-based input system; and when it is determined in the first determination that the first data includes the first part of the wakeup word, provide the first data to the processor, and wherein the memory stores one or more instructions which, when executed, cause the processor to:

receive the first data from the DSP circuit; transmit the first data to an external server via the communication circuit; perform a second determination to determine whether the first data includes the first part and a second part of the wakeup word and whether the user utterance is associated with a specified user, wherein the second part is different from the first part;

after determining that the first data includes the first part and the second part of the wakeup word, detecting whether the user utterance is associated with the specified user by calculating an identity score based on the first data associated with the user utterance, and determining whether the identity score is greater than or equal to a first identification reference value and a second identification reference value, receive a text generated from the first data by the external server;

when the text is received within a predefined period of time, perform a third determination to determine whether the received text matches the wakeup word; and after determining that the received text is determined to match the wakeup word in the third determination and determining that the identity score is greater than or equal to the first identification reference value and the second identification reference value, activate the voice-based input system, and based on determining that the identity score is greater than or equal to the first identification reference value and less than the second identification reference value, retrieving user-related information from an external server to determine whether the user utterance is associated with the specified user.

12. The electronic apparatus of claim 11, wherein the electronic apparatus is a mobile device,
wherein the processor includes an application processor (AP), and
wherein when the identity score is greater than or equal to the first identification reference value and less than the second identification reference value, determining whether to activate the voice-based input system according to whether the retrieved user-related information indicates that the user utterance is associated with the specified user.

13. The electronic apparatus of claim 11, wherein the user utterance includes a plurality of words, and
wherein the DSP circuit is configured to perform the first determination based at least in part on a subset of the plurality of words.

14. The electronic apparatus of claim 11, wherein the DSP circuit is configured to:
process the first data and the wakeup word in a first method to calculate a first value; and when the first value exceeds a first reference value, performing the first determination by the DSP circuit.

15. The electronic apparatus of claim 14, wherein the first method calculates a feature vector of the user utterance corresponding to the first data and substitutes the calculated feature vector of the user utterance into a keyword recognition model to calculate the first value; and
wherein the keyword recognition model is generated based on the feature vector of the wakeup word.

16. The electronic apparatus of claim 15, wherein the keyword recognition model is generated by comparing the feature vector of the wakeup word with another feature vector of another user utterance that is obtained by repeatedly entering the wakeup word.

17. The electronic apparatus of claim 15, wherein the one or more instructions cause the processor to:
process the first data and the wakeup word in a second method to calculate a second value; and
when the second value exceeds a second reference value, performing the second determination by the processor.

18. The electronic apparatus of claim 17, wherein the first method and the second method are different from each other or are the same as each other, and
wherein the first reference value and the second reference value are different from each other.

19. A method in an electronic device having a voice-based input system, the method comprising:
receiving, via a microphone of an apparatus, first data associated with a user utterance that is received;
performing, by a digital signal processing (DSP) circuit of the apparatus, a first determination to determine whether the user utterance includes the first data and a first part of a wakeup word to activate the voice-based input system;
transmitting, by the DSP circuit, the first data to a processor of the apparatus when the first data includes the first part of the wakeup word, wherein the DSP and the processor are implemented with a chip;
receiving, by the processor, the first data from the DSP circuit;
performing, by the processor, a second determination to determine whether the first data includes the first part and a second part of the wakeup word, wherein the second part is different from the first part;
after determining that the first data includes the first part and the second part of the wakeup word, detecting whether the user utterance is associated with a specified user by calculating an identity score based on the first data associated with the user utterance, and determining whether the identity score is greater than or equal to a first identification reference value and a second identification reference value;
activate, by the processor, the voice-based input system when the first data includes the first part and the second part of the wakeup word, and the identity score is greater than or equal to the first identification reference value and the second identification reference value indicating that the user utterance is associated with the specified user; and
based on determining that the identity score is greater than or equal to the first identification reference value and less than the second identification reference value, retrieving user-related information from an external server to determine whether the user utterance is associated with the specified user.

* * * * *